United States Patent
Fujii et al.

(10) Patent No.: US 7,415,085 B2
(45) Date of Patent: Aug. 19, 2008

(54) OFDM RECEIVER

(75) Inventors: Hiromasa Fujii, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 559 days.

(21) Appl. No.: 10/984,988

(22) Filed: Nov. 10, 2004

(65) Prior Publication Data

US 2005/0129136 A1   Jun. 16, 2005

(30) Foreign Application Priority Data

Nov. 11, 2003   (JP)   ............................. 2003-381588

(51) Int. Cl.
*H03D 1/06*   (2006.01)
*H04B 1/00*   (2006.01)
(52) U.S. Cl. ..................... 375/346; 375/348; 375/148
(58) Field of Classification Search ................ 375/316, 375/341–356, 147, 148
See application file for complete search history.

(56) References Cited

U.S. PATENT DOCUMENTS

| | | | | |
|---|---|---|---|---|
| 7,123,670 | B2 * | 10/2006 | Gilbert et al. | 375/344 |
| 7,127,019 | B2 * | 10/2006 | Koslov | 375/371 |
| 7,133,479 | B2 * | 11/2006 | Lee | 375/354 |
| 7,180,963 | B2 * | 2/2007 | Wang et al. | 375/324 |
| 7,203,261 | B2 * | 4/2007 | Gupta | 375/376 |
| 7,218,691 | B1 * | 5/2007 | Narasimhan | 375/344 |
| 7,251,283 | B2 * | 7/2007 | Chen | 375/260 |
| 2002/0145971 | A1 * | 10/2002 | Cho et al. | 370/208 |
| 2002/0181549 | A1 * | 12/2002 | Linnartz et al. | 375/142 |
| 2002/0196880 | A1 * | 12/2002 | Koslov | 375/349 |
| 2003/0053571 | A1 * | 3/2003 | Belotserkovsky et al. | 375/350 |

(Continued)

FOREIGN PATENT DOCUMENTS

| DE | 44 25 713 C1 | 4/1995 |
|---|---|---|
| EP | 1 178 642 A2 | 2/2002 |

OTHER PUBLICATIONS

Satoshi Suyama, et al., "An OFDM Receiver with Smoothed FFT-Window and RLS-MLSE for Fast Multipath Fading Environments with Large Delay Spread", IEEE 7th Inter. Symp. on Spread-Spectrum Tech. & Appl., vol. 2, XP-010615490, Sep. 2, 2002, pp. 353-357.

(Continued)

*Primary Examiner*—Chieh M. Fan
*Assistant Examiner*—Jason M. Perilla
(74) *Attorney, Agent, or Firm*—Oblon, Spivak, McClelland, Maier & Neustadt, P.C.

(57) ABSTRACT

An OFDM receiver receives an OFDM signal transmitted from an OFDM transmitter by using a sub-carrier. The OFDM receiver includes a channel estimator configured to obtain a channel estimated value of each multi-path based on OFDM signals received through a plurality of multi-paths; a transmission signal estimated value calculator configured to calculate a transmission signal estimated value as an estimated value of the OFDM signal; and an inter-carrier interference compensator configured to extract a multi-path not becoming a form to contain a signal component only of a target symbol in an FFT window based on the transmission signal estimated value and the channel estimated value of each multi-path, and to compensate for inter-carrier interference in the OFDM signal based on signal components corresponding to all sub-carriers of the multi-paths.

9 Claims, 24 Drawing Sheets

U.S. PATENT DOCUMENTS

| | | | |
|---|---|---|---|
| 2003/0058966 A1* | 3/2003 | Gilbert et al. | 375/326 |
| 2003/0072382 A1* | 4/2003 | Raleigh et al. | 375/267 |
| 2003/0123582 A1* | 7/2003 | Kim et al. | 375/347 |
| 2004/0062302 A1* | 4/2004 | Fujii et al. | 375/232 |
| 2004/0076224 A1* | 4/2004 | Onggosanusi et al. | 375/144 |
| 2004/0120412 A1* | 6/2004 | Banerjea | 375/260 |
| 2004/0120428 A1* | 6/2004 | Maltsev et al. | 375/341 |
| 2004/0190637 A1* | 9/2004 | Maltsev et al. | 375/260 |
| 2004/0196915 A1* | 10/2004 | Gupta | 375/260 |
| 2004/0208267 A1* | 10/2004 | Lee | 375/354 |
| 2005/0084025 A1* | 4/2005 | Chen | 375/260 |
| 2005/0100106 A1* | 5/2005 | Chen | 375/260 |
| 2006/0165187 A1* | 7/2006 | Troya et al. | 375/260 |

OTHER PUBLICATIONS

Dukhyun Kim, "Residual ISI Cancellation for OFDM with Applications to HDTV Broadcasting", IEEE Journal on Selected Areas in Communications, vol. 16, No. 8, Oct. 1998, pp. 1590-1599.

* cited by examiner

FIG. 11

| SUB-CARRIER #1~n | h(0)s(1) | h(0)s(2) | h(0)s(3) | h(0)s(4) |
|---|---|---|---|---|
| SUB-CARRIER #1~n | h(1)s(4) | h(1)s(1) | h(1)s(2) | h(1)s(3) |
| SUB-CARRIER #1~n | h(2)s(3) | h(2)s(4) | h(2)s(1) | h(2)s(2) |
| | | | | |
| RECEIVED OFDM SIGNAL | r(1) | r(2) | r(3) | r(4) |

OFDM RECEIVER

CROSS REFERENCE TO RELATED APPLICATION

This application is based upon and claims the benefit of priority from the prior Japanese Patent Application No. P2003-381588, filed on Nov. 11, 2003; the entire contents of which are incorporated herein by reference.

BACKGROUND OF THE INVENTION

1. Field of the Invention

The present invention relates to an OFDM receiver which receives an OFDM signal transmitted from an OFDM transmitter by using a sub-carrier.

2. Description of the Related Art

Referring to FIG. 1, description is made of a configuration of a conventional orthogonal frequency division multiplexing (OFDM) transmitter (OFDM transmitter of a conventional technology 1, hereinafter) 100.

As shown in FIG. 1, the conventional OFDM transmitter 100 of the conventional technology 1 mainly includes an encoder section 101, an interleaver section 102, a mapping section 103, an IFFT section 104, and a guard interval addition section 105.

The encoder section 101 is configured to execute error correction encoding processing for an input information signal (information bit).

The interleaver section 102 is configured to execute interleave processing for the information signal output from the encoder section 101, and to output the signal to the mapping section 103.

The mapping section 103 is configured to map the information signal output from the interleaver section 102 in a symbol.

For example, when 16 QAM is used as a modulation system, the mapping section 103 maps four "0, 1" signals in one symbol constituted of 16 points on an IQ plane.

The mapping section 103 is configured to map the symbol in a plurality of sub-carriers, and to output the sub-carriers to the IFFT section 104. Here, the plurality of sub-carriers are orthogonal to each other in frequency.

The IFFT section 104 is configured to execute IFFT (inverse fast Fourier transformation) processing for the symbols mapped in the plurality of sub-carriers which have been output from the symbol mapping section 103 on a predetermined FFT window, and to output a transmission signal of a time domain.

For example, as shown in FIG. 1, the transmission signal of the time domain contains signal components "s(1) to s(4)". Here, "s(k)" indicates a transmitted signal component (symbol), and "k" indicates an index which shows a symbol transmission order before guard interval addition. Incidentally, as shown in FIG. 1, each signal component "s(k)" is formed by signal components corresponding to the plurality of sub-carriers.

The guard interval addition section 105 is configured to copy a part of the transmission signal output from the IFFT section 104 (e.g., signal components "s(3) and s(4)"), and to add the copy to the transmission signal of the time domain.

Here, a part of the copied transmission signal of the time domain (e.g., signal components "s(3) and s(4)") is equivalent to a "guard interval".

The transmission signal of the time domain (OFDM signal, hereinafter) to which the guard interval has been added is transmitted from an antenna of the OFDM transmitter 100 to an OFDM receiver.

Next, referring to FIG. 2, description will be made of a configuration of the OFDM receiver 200 of the conventional technology 1. As shown in FIG. 2, the conventional OFDM receiver 200 mainly includes an FFT section 201, a linear filter section 202, a filter generation section 203, a demapping section 204, a deinterleaver section 205, and a decoder section 206.

The FFT section 201 is configured to remove a guard interval from the OFDM signal transmitted from the OFDM transmitter 100. Subsequently, as described later, the FFT section 201 is configured to execute FFT (Fast Fourier Transformation) processing for the OFDM signal on a set FFT window, and to output a signal of a frequency domain corresponding to each sub-carrier.

FIG. 3 shows signal components of the OFDM signal received by the FFT section 201. FIG. 3 shows an example in which the FFT section 201 receives the OFDM signal from the OFDM transmitter 100 through three multi-paths #0 to #2. In the example of FIG. 3, the number of FFT points (FFT window size) is "4", and the number of guard interval points (guard interval length) is "2".

In this case, "s(k)" indicates a transmitted signal component, and "k" indicates an index which indicates a transmission symbol transmission order before guard interval addition. "h(1)" indicates a signal component received through the first multi-path #1.

The real OFDM signal in the FFT section 201 becomes a sum of all the signal components at each point of time, i.e., a total of the signal components of all rows of FIG. 3 (for each column).

Ideally, in order to detect signal components which constitute a specific symbol, the FFT section 201 must set an FFT window so as not to contain signal components which constitute previous and subsequent symbols.

By setting the FFT window in the above manner, in each of the OFDM signals received through the multi-paths #0 to #2, each row in the FFT window contains signal components (e.g., "s(1) to s(4)") constituting a target symbol. Accordingly, orthogonality of the sub-carriers can be maintained.

Even when the signal components constituting the target symbol (e.g., "s(1) to s(4)") are cyclically shifted in the FFT window, the orthogonality of the sub-carriers can be maintained.

As a result, a channel of each sub-carrier can be regarded as flat fading in the OFDM receiver 200.

A signal of a frequency domain corresponding to each sub-carrier is subjected to compensation processing for channel variation through the linear filter section 202 and the filter generation section 203.

The demapping section 204 is configured to execute demapping processing for the signal of the frequency domain corresponding to each sub-carrier which has been output from the linear filter section 202, and to output the information signal to the deinterleaver section 205.

The deinterleaver section 205 is configured to execute deinteleaving processing for the information signal output from the demapping section 204, and to output the information signal to the decoder section 206.

The decoder section 206 is configured to execute error correction decoding processing for the information signal output from the deinterleaver section 205, thereby reproducing the information signal input to the OFDM transmitter 100.

However, in the OFDM receiver 200 of the conventional art 1, when an impulse response length exceeds a guard interval length, a problem occurs. Referring to FIG. 4, the problem will be described.

In an example of FIG. 4, i.e., in an example in which the FFT section 201 receives the OFDM signal through the four multi-paths #0 to #4, unlike the case of FIG. 3, the FFT section 201 cannot set an FFT window so as not to contain signal components of previous and subsequent symbols when signal components of a specific symbol are detected.

Consequently, for the signal components of the specific symbol, inter-symbol interference (ISI) occurs due to the signal components of the previous and subsequent symbols.

Additionally, in the example of FIG. 4, the OFDM signal received through the multi-path #3 is not formed in a manner that only signal components (e.g., "s(1) to s(4)") only of a target symbol are contained in the FFT window.

Consequently, orthogonality of the sub-carriers is disturbed (because the signal components "s(1) to s(4)" are not even in a form of being cyclically shifted), and inter-carrier interference (ICI) occurs by the adjacent sub-carriers.

Generally, as it can prevent deterioration of reception characteristics through the multi-paths, an OFDM transmission system is an effective transmission system especially in a wide band transmission in which a multi-path influence becomes conspicuous.

However, in the OFDM transmission system, a guard interval length to be added must be set longer than a channel impulse response length. In the case of "(guard interval length+1 FFT point length)<(channel impulse response length)", in addition to the occurrence of inter-symbol interference caused by the multi-path influence, the orthogonality of the sub-carriers is lost. Thus, there is a problem in that inter-carrier interference also occurs.

In this regard, in the OFDM transmission system, when a guard interval length is set long by imagining a longest impulse response length whose probability is low but which may occur depending on surrounding situations, frequency use efficiency is reduced.

Thus, a transmission system has been requested which can prevent deterioration of reception characteristics caused by inter-symbol interference and inter-carrier interference, even when a channel impulse response length exceeds the guard interval length.

To solve the problem, i.e., as countermeasures when the channel impulse response length exceeds the guard interval length, an OFDM receiver of a conventional technology 2 has been presented.

FIG. 5 shows a configuration of an OFDM receiver 200 of the conventional technology 2. The entire configuration of the OFDM receiver 200 of the conventional technology 2 is a turbo-equalization receiver. Incidentally, in place of the FFT processing, MMSE filtering processing is used to convert a signal of a time domain into a signal of a frequency domain.

Specifically, as shown in FIG. 5, the OFDM receiver 200 of the conventional technology 2 includes an ISI compensation section 300, an ICI compensation section 400, a channel estimation section 208, a linear filter section 202, a filer generation section 203, a demapping section 204, a deinterleaver section 205, a decoder section 206, and a transmission signal estimated value obtaining section 207.

The channel estimation section 208 is configured to obtain channel estimated values of the multi-paths #1 to #3 based on the OFDM signals received through the plurality of multi-paths #0 to #3 (FIG. 8), and to transmit the obtained channel estimated values (including impulse response length) to the ISI compensation section 300 and the ICI compensation section 400.

The ISI compensation section 300 is configured to execute ISI compensation processing for the signal received from the OFDM transmitter 100, based on the channel estimated value from the channel estimation section 208 and a transmission signal estimated value from the transmission signal estimated value obtaining section 207.

Specifically, as shown in FIG. 6, the ISI compensation section 300 includes an ISI component selection section 302, a channel simulator section 303, and a subtraction section 304.

The ISI component selection section 302 is configured to select a signal component likely to cause inter-symbol interference from among the transmission signal estimated value from the transmission signal estimated value obtaining section 207 based on the impulse response length from the channel estimation section 208, and to output the signal component to the channel simulator section 303.

In an example of FIG. 8, based on the impulse response length from the channel estimation section 208, the ISI component selection section 302 selects a signal component "s(4−Ns)" received after a delay exceeding a guard interval from among the transmission signal estimated value from the transmission signal estimated value obtaining section 207, as a signal component likely to cause inter-symbol interference, and outputs the signal component to the channel simulator section 303.

The channel simulator section 303 is configured to convolute a channel impulse response in the signal component from the ISI component selection section 302 based on the channel estimated value from the channel estimation section 208, so as to obtain a replica indicating an interference signal component to be canceled, and to output the replica to the subtraction section 304.

In the example of FIG. 8, the channel simulator section 303 convolutes a channel impulse response of the multi-path #3 in the signal component "s(4−Ns)" from the ISI component selection section 302, so as to obtain a replica "h(3)s(4−Ns)", and to output the replica to the subtraction section 304.

The subtraction section 304 is configured to subtract the replica ("h(3)s(4−Ns)" in the example of FIG. 8) output from the channel simulator section 303 from the received OFDM signal, so as to obtain an OFDM signal after ISI compensation, and to output the OFDM signal to the ICI compensation section 400.

The ICI compensation section 400 is configured to execute ICI compensation processing for the OFDM signal after the ISI compensation from the ISI compensation section 300, based on the channel estimated value from the channel estimation section 208 and the transmission signal estimated value from the transmission signal estimated value obtaining section 207.

Specifically, as shown in FIG. 7, the ICI compensation section 400 includes an ICI compensation section $400_1$ for a sub-carrier #1 to an ICI compensation section $400_n$ for a sub-carrier #n. The ICI compensation sections $400_1$ to $400_n$ are all similar in structure, and thus the ICI compensation section $400_1$ only for the sub-carrier #1 is described.

As shown in FIG. 7, the ICI compensation section $400_1$ for the sub-carrier #1 includes an undesired transmission signal estimated value selection section 401, an ICI component selection section 403, a channel simulator section 404, a subtraction section 405, a guard interval removal section 406, and a sub-carrier component extraction section 407.

The undesired transmission signal estimated value selection section 401 is configured to convert, in a frequency domain, transmission signal estimated values (signals of a time domain) from the transmission signal estimated value obtaining section 207 into signals of the frequency domain, to select transmission signal estimated values (signals of the frequency domain) corresponding to the sub-carriers #2 to #n other than the sub-carrier #1 from the transmission signal estimated values, to convert the selected transmission signal estimated values (signals of the frequency domain) into signals of the time domain, and to output the signals to the ICI component selection section 403.

Based on an impulse response length from the channel estimation section 208, the ICI component selection section 403 is configured to select signal components likely to cause inter-carrier interference from among the transmission signal estimated values corresponding to the sub-carriers #2 to #n from the undesired transmission signal estimated value selection section 401, and to output the signal components to the channel simulator section 404.

In the example of FIG. 8, based on the impulse response length from the channel estimation section 208, the ICI component selection section 403 extracts a multi-path #3 which does not become a form (including a cyclically shifted form) containing signal components "s(1) to s(4)" only which constitute a target symbol in the FFT window used by the OFDM transmitter 100.

Subsequently, the ICI component selection section 403 selects the signal components "s(3), s(4) and s(1)" in the FFT window of the OFDM signal received through the multi-path #3, as signal components likely to cause inter-carrier interference, and outputs the signal components "s(3), s(4) and s(1)" to the channel simulator section 404.

The channel simulator section 404 is configured to convolute a channel impulse response in the signal components from the ICI component selection section 403 based on the channel estimated value from the channel estimation section 208, so as to obtain replicas indicating interference signal components to be canceled, and to output the replicas to the subtraction section 405.

In the example of FIG. 8, the channel simulator section 404 obtains replicas "h(3)s(3), h(3)s(4) and h(3)s(1)" by convoluting the channel impulse response of the multi-path #3 in the signal components "s(3), s(4) and s(1)" of those from the ICI component selection section 403, and outputs the replicas "h(3)s(3), h(3)s(4) and h(3)s(1)" to the subtraction section 304.

The subtraction section 405 is configured to obtain a signal by subtracting the replicas (in the example of FIG. 8, "h(3)s(3), h(3)s(4) and h(3)s(1)" from the channel simulator section 404, from the OFDM signal after the ISI compensation, and to output the obtained signal to the guard interval removal section 406.

The guard interval removal section 406 is configured to remove a guard interval from the signal sent from the subtraction section 405, and to output the signal to the sub-carrier component extraction section 407.

FIG. 9 shows signal components contained in signals output from the guard interval removal section 406.

As shown in FIG. 9, the signals output from the guard interval removal section 406 contain signal components "h(0)s(1) to h(0)s(4)", "h(1)s(1) to h(1)s(4)", and "h(2)s(2) to h(2)s(4)" corresponding to all the sub-carriers regarding the signals received through the multi-paths #0 to #2, and signal components "h(3)s(3), h(3)s(4) and h(3)s(1)" corresponding to the sub-carrier #1 regarding the signals received through the multi-path #3.

The sub-carrier component extraction section 407 is configured to multiply the signal output from the guard interval removal section 406 by a row vector constituted of 1st line elements of a DFT (Discrete Fourier Transformation) matrix described below, so as to calculate a signal of a frequency domain (OFDM signal after ICI compensation) corresponding to the sub-carrier 1, and to output the signal of a frequency domain to the linear filter section 202.

$$F = \begin{bmatrix} 1 & 1 & \cdots & & & 1 \\ 1 & w & w^2 & & & w^N \\ & w^2 & \ddots & & & \\ \vdots & \vdots & & w^{(i-1)\times(j-1)} & & \vdots \\ & & & & \ddots & \\ 1 & w^N & \cdots & & & \end{bmatrix}, w = e^{-j\frac{2\pi}{N}}$$

According to the conventional technology 2, the sub-carrier component extraction section 407 includes an MMSE filter.

Incidentally, in order to reproduce information signals by taking signal components of OFDM signals received through all the multi-paths #0 to #3 into consideration, the ICI sub-carrier compensation section 400 is configured not to cancel all the signal components "(h (3) s(x)" of the OFDM signal received through the multi-path #3 from among the OFDM signals after ISI compensation, but to cancel signal components "h(3)s(x)" only corresponding to the sub-carrier other than a specific sub-carrier from among the signal components "h (3) s(x)" of the OFDM signal received through the multi-path #3.

The transmission signal estimated value obtaining section 207 is configured to execute processing similar to the error correction encoding processing, interleaving processing, symbol mapping processing, guard interval adding processing, and IFFT processing of the OFDM transmitter 100 for the information signal reproduced by the decoder section 206, so as to calculate a transmission signal estimated value which is an estimated value of the OFDM signal sent from the OFDM transmitter 100, and to output the transmission signal estimated value to the ISI compensation section 300, the ICI compensation section 400, the linear filter section 202 and the filter generation section 203.

However, in the conventional OFDM receiver 200, a replica must be generated for each sub-carrier since the information signals are reproduced by taking the signal components of the OFDM signals received through all the multi-paths into consideration. Consequently, there is a problem in that the amount of processing for ICI compensation becomes very large.

Furthermore, in the conventional OFDM receiver 200, since the information signals are reproduced by taking the signal components of the OFDM signals received through all the multi-paths into consideration, ICI compensation processing is executed for each sub-carrier. Consequently, FFT (Fast Discrete Fourier Transformation) processing cannot be used, so as to create a problem in that the amount of processing becomes very large.

BRIEF SUMMARY OF THE INVENTION

In viewing of the foregoing, it is an object of the present invention to provide an OFDM receiver capable of reducing the amount of processing for executing ICI compensation in a multi-path environment.

A first aspect of the present invention is summarized as an OFDM receiver which receives an OFDM signal transmitted from an OFDM transmitter by using a sub-carrier. The OFDM receiver includes a channel estimator configured to obtain a channel estimated value of each multi-path based on OFDM signals received through a plurality of multi-paths; a transmission signal estimated value calculator configured to calculate a transmission signal estimated value as an estimated value of the OFDM signal; and an inter-carrier interference compensator configured to extract a multi-path not becoming a form to contain a signal component only of a target symbol in an FFT window based on the transmission signal estimated value and the channel estimated value of each multi-path, and to compensate for inter-carrier interference in the OFDM signal based on signal components corresponding to all sub-carriers of the multi-paths.

In the first aspect, the inter-carrier interference compensator can include an inter-carrier interference signal component selector configured to extract the multi-path not becoming the form to contain the signal component only of the target symbol based on the transmission signal estimated value and the channel estimated value of each multi-path, and to select inter-carrier interference signal components corresponding to all the sub-carriers in the FFT window received through the multi-paths; a channel simulator configured to generate replicas constituted of a selected inter-carrier interference signal components; a subtractor configured to subtract the replicas from the received OFDM signal; and a Fast Fourier Transformer configured to execute FFT processing for a replica-subtracted OFDM signal.

In the first aspect, the inter-carrier interference compensator can include an inter-carrier interference signal component selector configured to extract the multi-path not becoming the form to contain the signal component only of the target symbol based on the transmission signal estimated value and the channel estimated value of each multi-path, to select inter-carrier interference signal components corresponding to all the sub-carriers in the FFT window received through the multi-paths, and to select signal components corresponding to all the sub-carriers constituting the target symbol together with the inter-carrier interference signal components; a channel simulator configured to generate replicas constituted of the selected signal components; an adder configured to add the replicas to the received OFDM signal; and an Fast Fourier Transformer configured to execute FFT processing for a replica-added OFDM signal.

In the first aspect, an operation and a stop of the inter-carrier interference compensator can be controlled based on an error detection result for the received OFDM signal.

In the first aspect, when a first signal component constituting the target symbol together with a first inter-carrier interference signal component of a first multi-path in the FFT window is contained in an FFT window before the FFT window, and when a second signal component constituting the target symbol together with a second inter-carrier interference signal component of a second multi-path in the FFT window is contained in an FFT window after the FFT window, the channel simulator can be configured to generate a first replica constituted of the first signal component and a second replica constituted of a second signal component; and the adder can be configured to add the first replica and the second replica to the received OFDM signal.

In the first aspect, the OFDM receiver can include an FFT window setter configured to set an FFT window used for the FFT processing, so as to cause the signal component constituting the target symbol together with the inter-carrier interference signal component in the FFT window to be contained in one of an FFT window before the FFT window and an FFT window after the FFT window.

In the first aspect, a guard interval length added to a training symbol can be longer than that added to a data symbol.

In the first aspect, a guard interval length added to a training symbol can be decided based on the maximum number of compensation points.

In the first aspect, the OFDM receiver include an MIMO equalizer configured to separate OFDM signals compensated for inter-channel interference by streams.

BRIEF DESCRIPTION OF THE SEVERAL VIEWS OF THE DRAWINGS

FIG. 11 is a diagram showing a signal component of an OFDM signal after ICI compensation by the ICI compensation section of the OFDM receiver according to the first embodiment of the present invention;

DETAILED DESCRIPTION OF THE INVENTION

First Embodiment

Hereinafter, description will be made of an OFDM receiver according to a first embodiment of the present invention with reference to the accompanying drawings. The OFDM receiver 200 of the first embodiment is configured to receive OFDM signals sent through sub-carriers from an OFDM transmitter 100.

The OFDM receiver 200 of the first embodiment is similar in configuration to the OFDM receiver 200 of the conventional technology 2 except an ICI compensation section 400. Thus, a configuration of the ICI compensation section 400 of the OFDM receiver 200 of the first embodiment will be described hereinafter.

Figure 10:
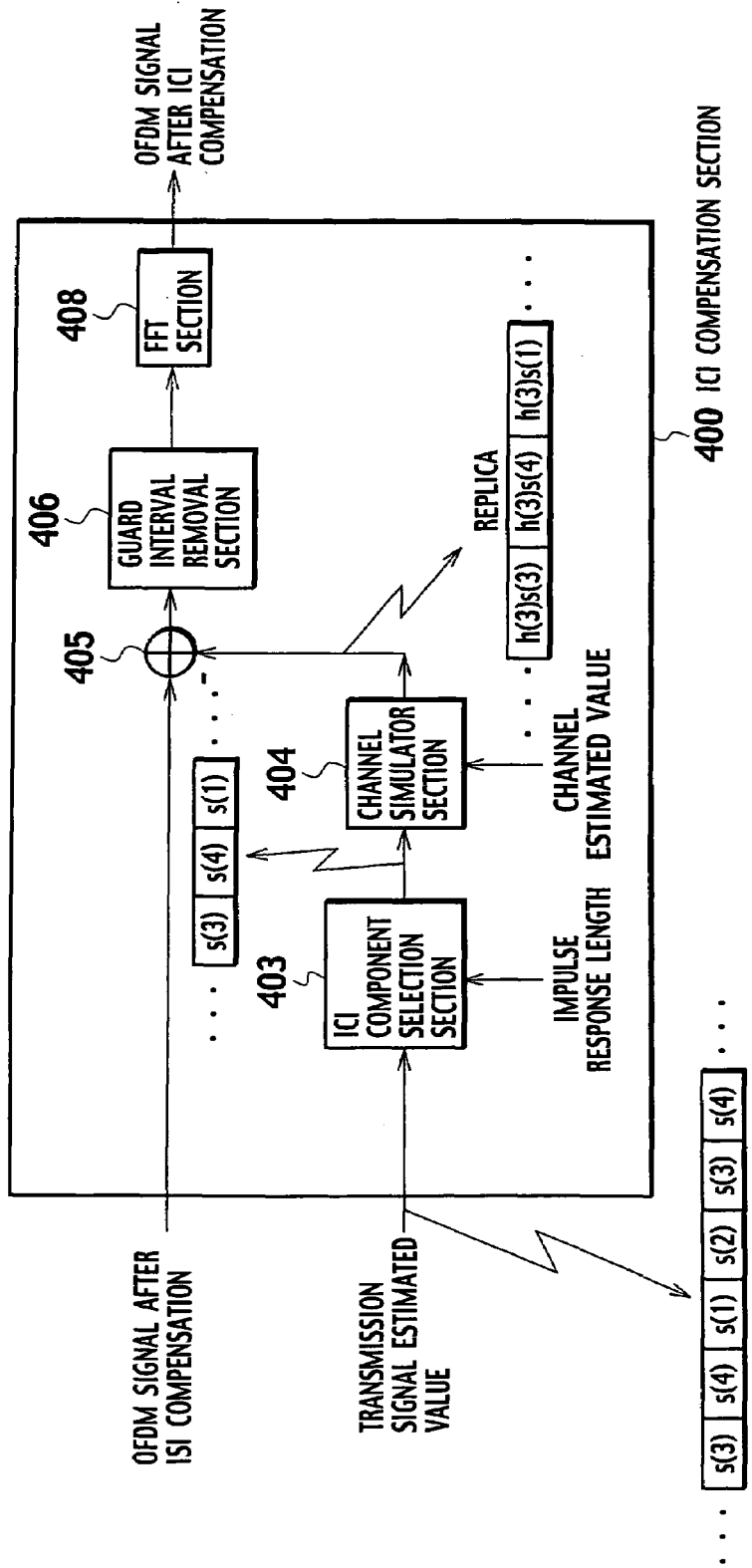
FIG. 10 is a functional block diagram of an ICI compensation section of an OFDM receiver according to a first embodiment of the present invention.

As shown in FIG. 10, the ICI compensation section 400 of the first embodiment includes an ICI component selection section 403, a channel simulator section 404, a subtraction section 405, a guard interval removal section 406, and an FFT section 408.

Based on an impulse response length from a channel estimation section 208, the ICI component selection section 403 is configured to select signal components likely to cause inter-carrier interference from among transmission signal estimated values from a transmission signal estimated value obtaining section 207, and to output the signal components to the channel simulator section 404.

Here, different from the case of the OFDM receiver 200 of the conventional technology 2, the inter-carrier interference signal components output from the channel simulator section 404 contain signal components corresponding to all sub-carriers (all the sub-carrier components).

Figure 1:
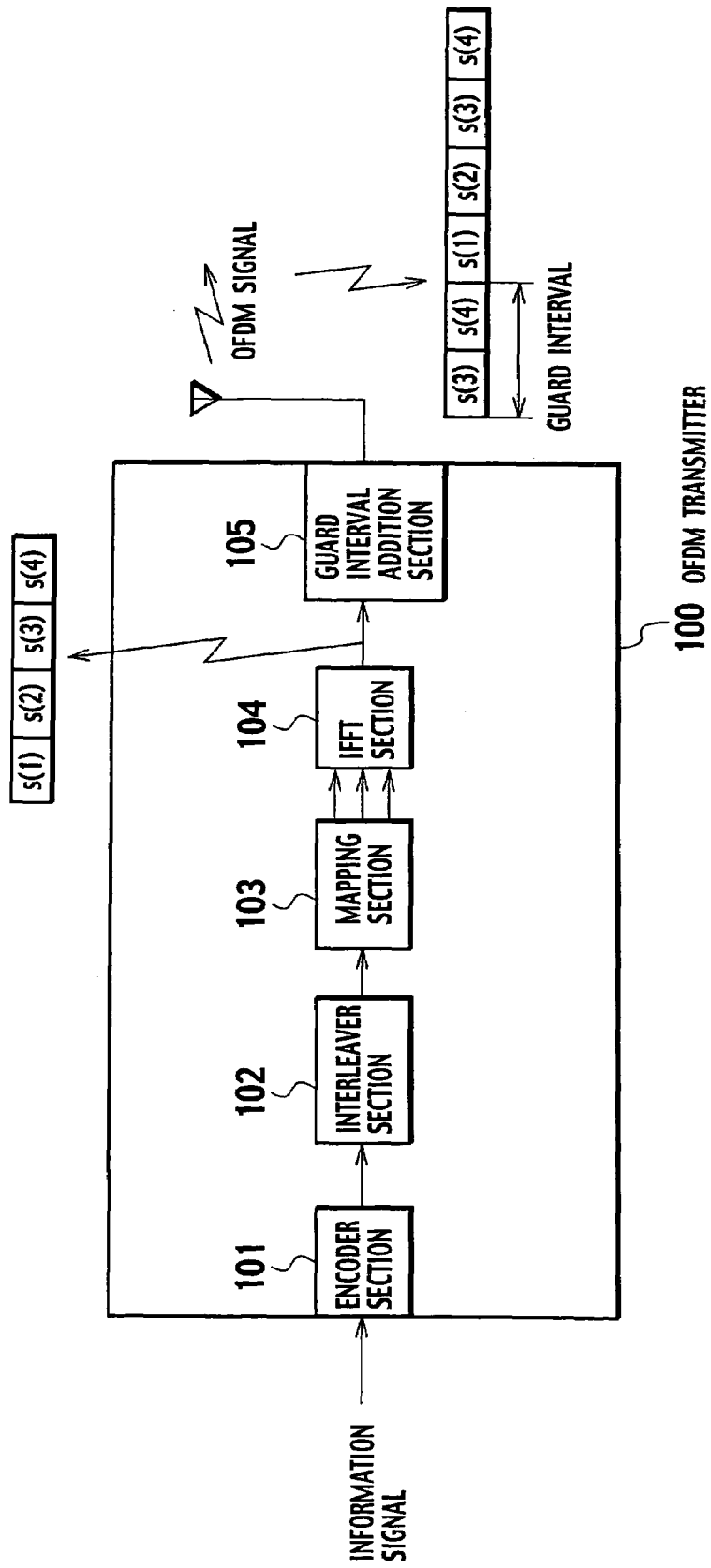
FIG. 1 is a functional block diagram of an OFDM transmitter according to a conventional technology 1.
Figure 2:
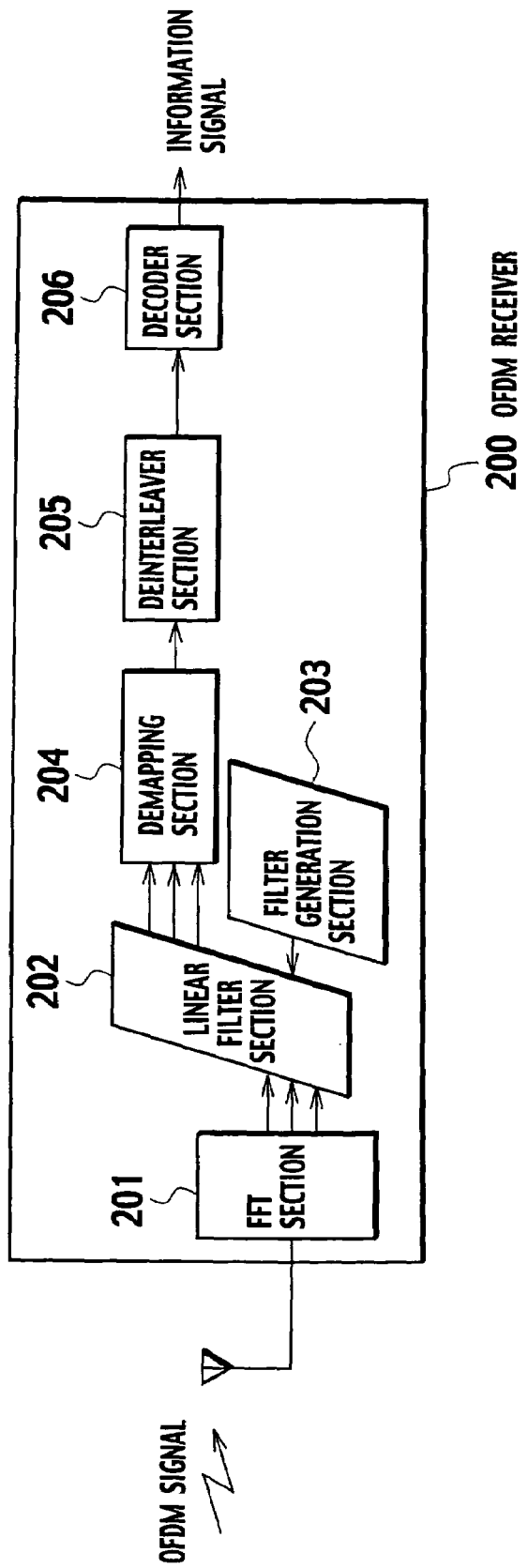
FIG. 2 is a functional block diagram of an OFDM receiver according to the conventional technology 1.
Figure 3:
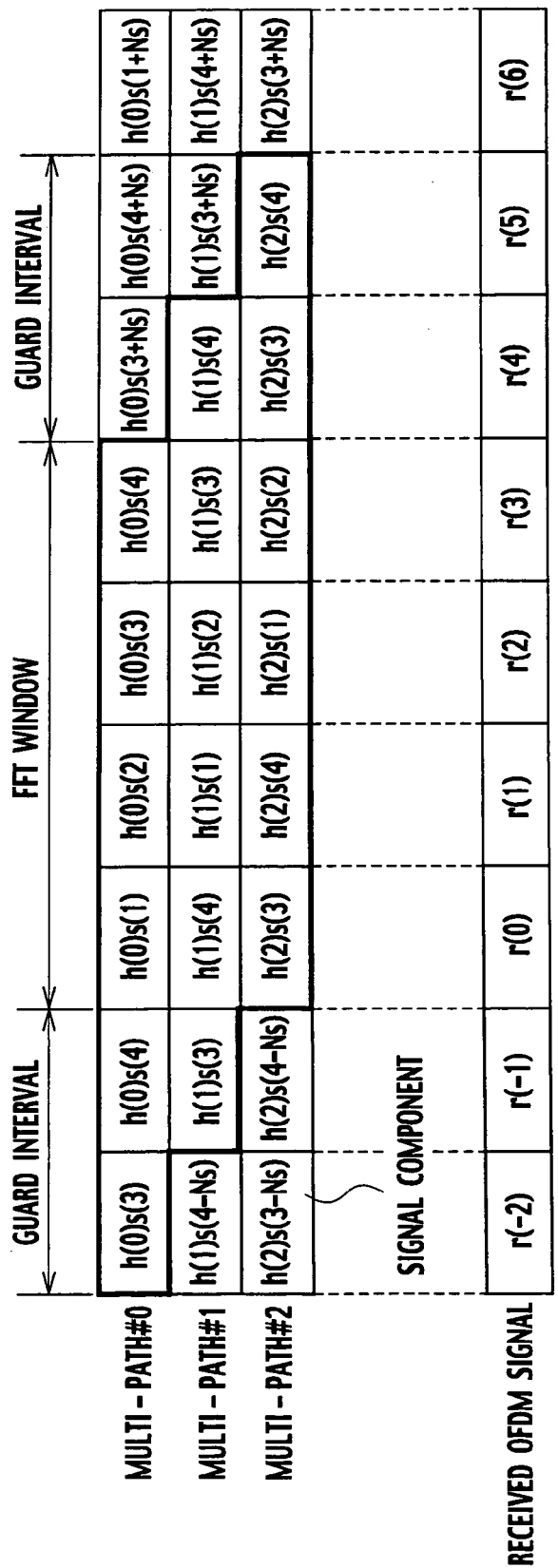
FIG. 3 is a diagram showing an example of an OFDM signal when inter-symbol interference and inter-carrier interference do not occur in the OFDM receiver of the conventional technology 1.
Figure 4:
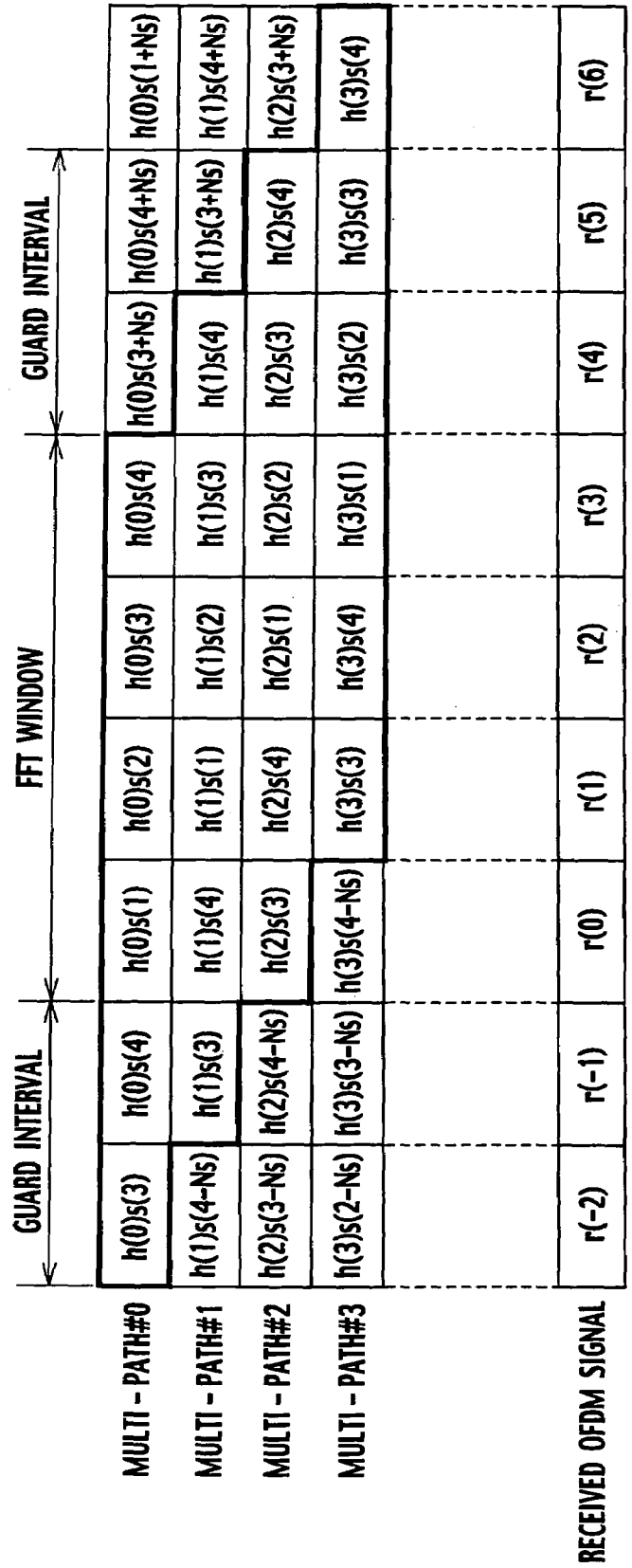
FIG. 4 is a diagram showing an example of an OFDM signal when inter-symbol interference and inter-carrier interference occur in the OFDM receiver of the conventional technology 1.
Figure 5:
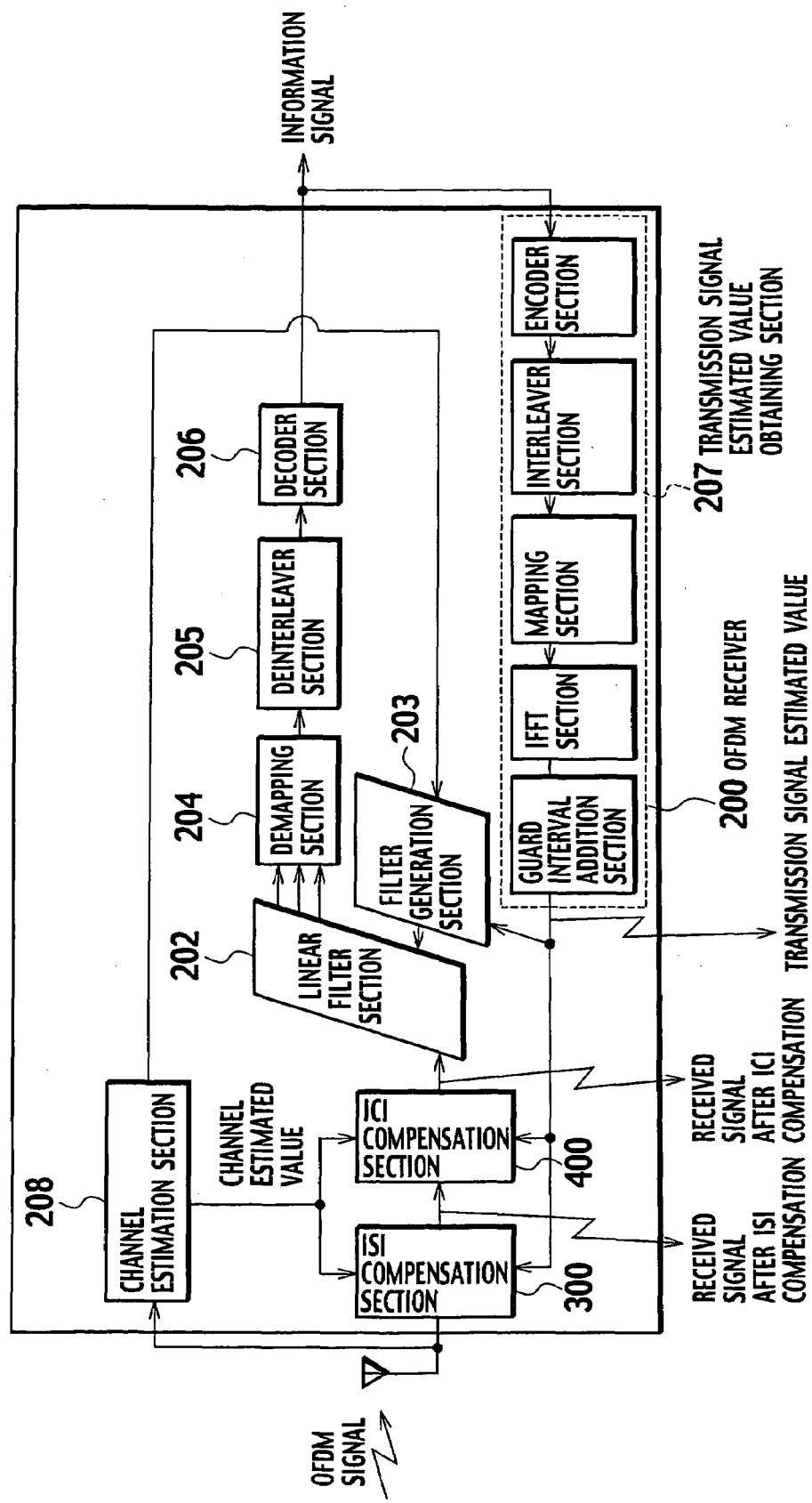
FIG. 5 is a functional block diagram of an OFDM receiver according to a conventional technology 2.
Figure 6:
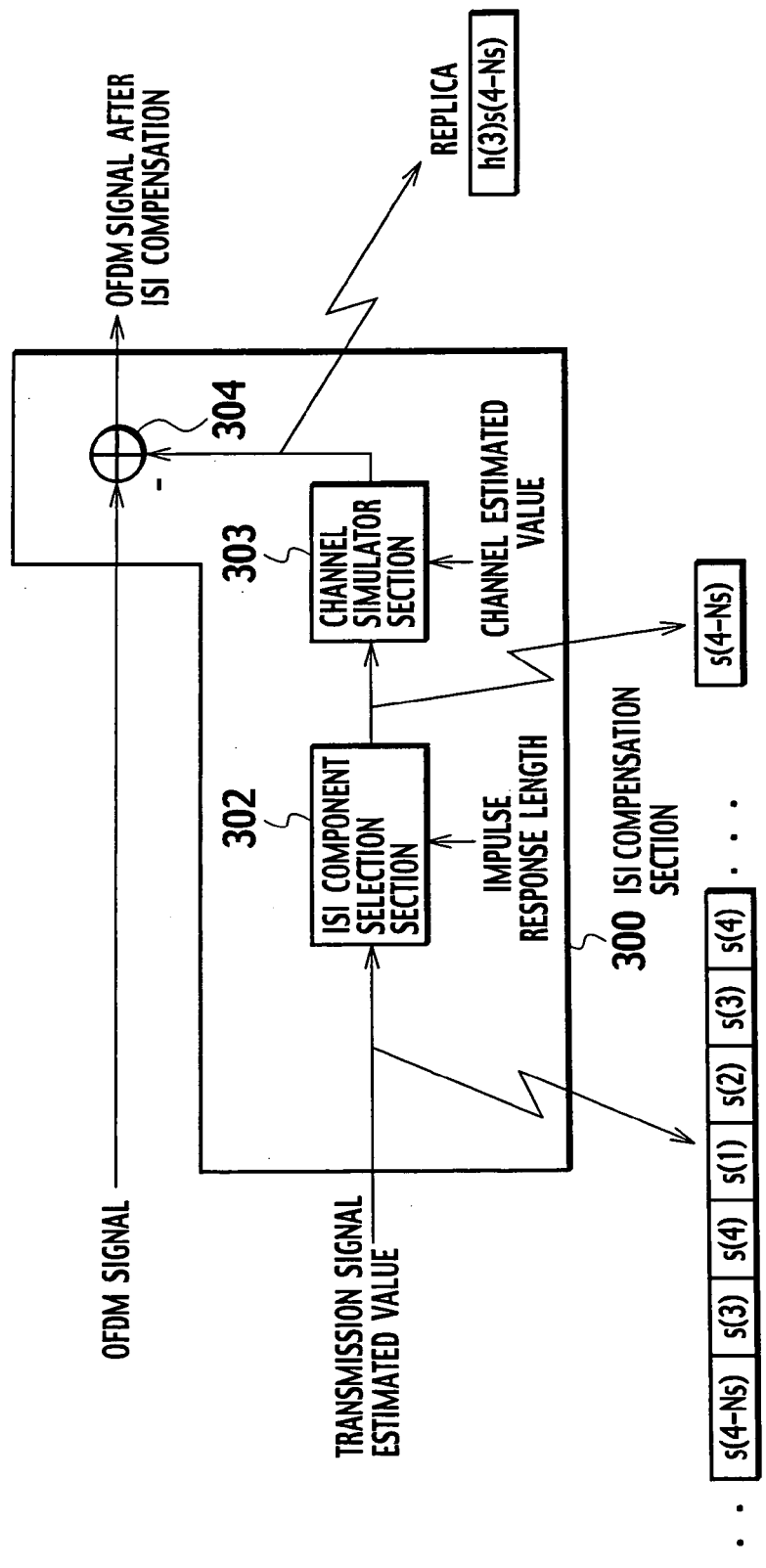
FIG. 6 is a functional block diagram of an ISI compensation section of the OFDM receiver according to the conventional technology 2.
Figure 7:
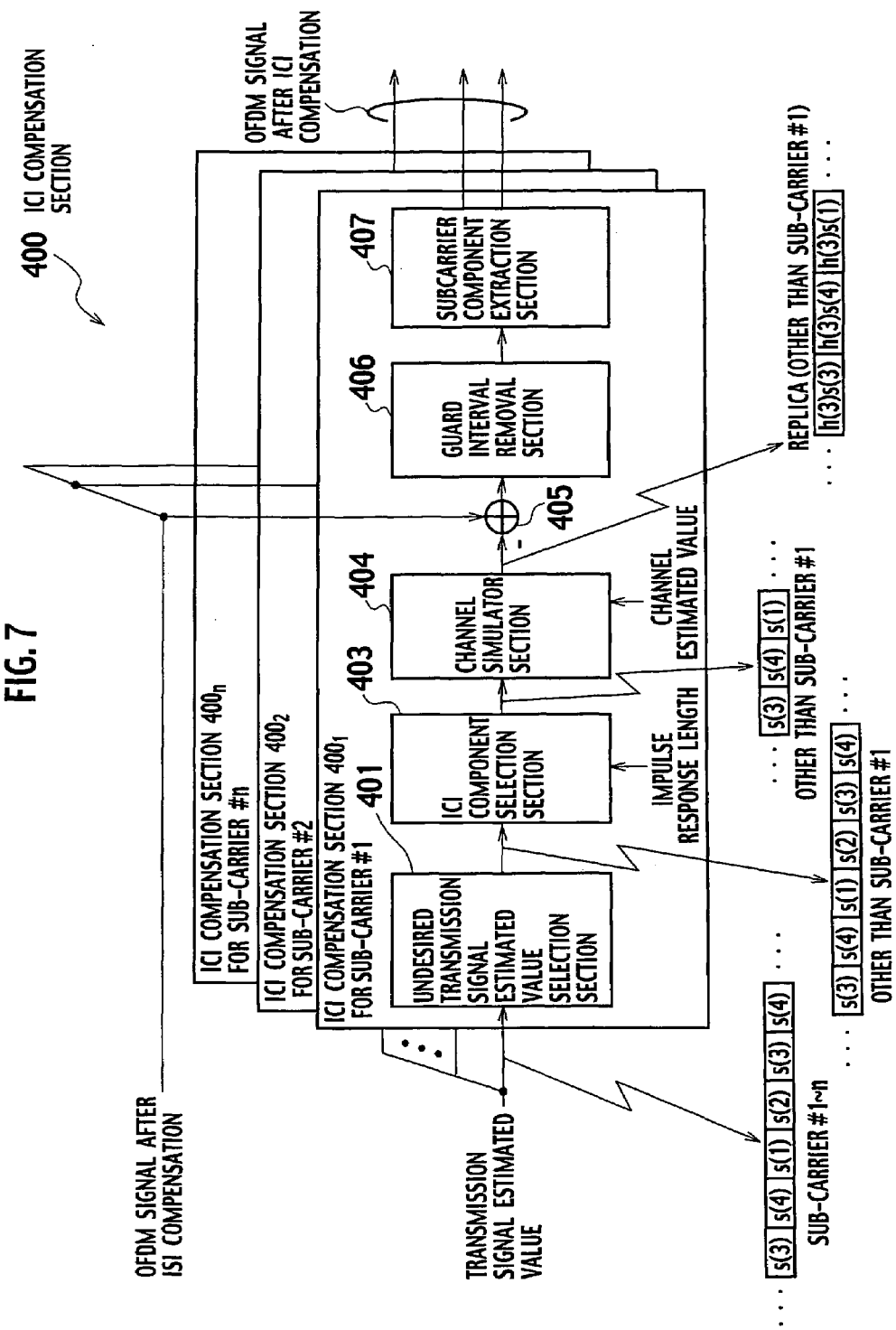
FIG. 7 is a functional block diagram of an ICI compensation section of the OFDM receiver according to the conventional technology 2.
Figure 8:
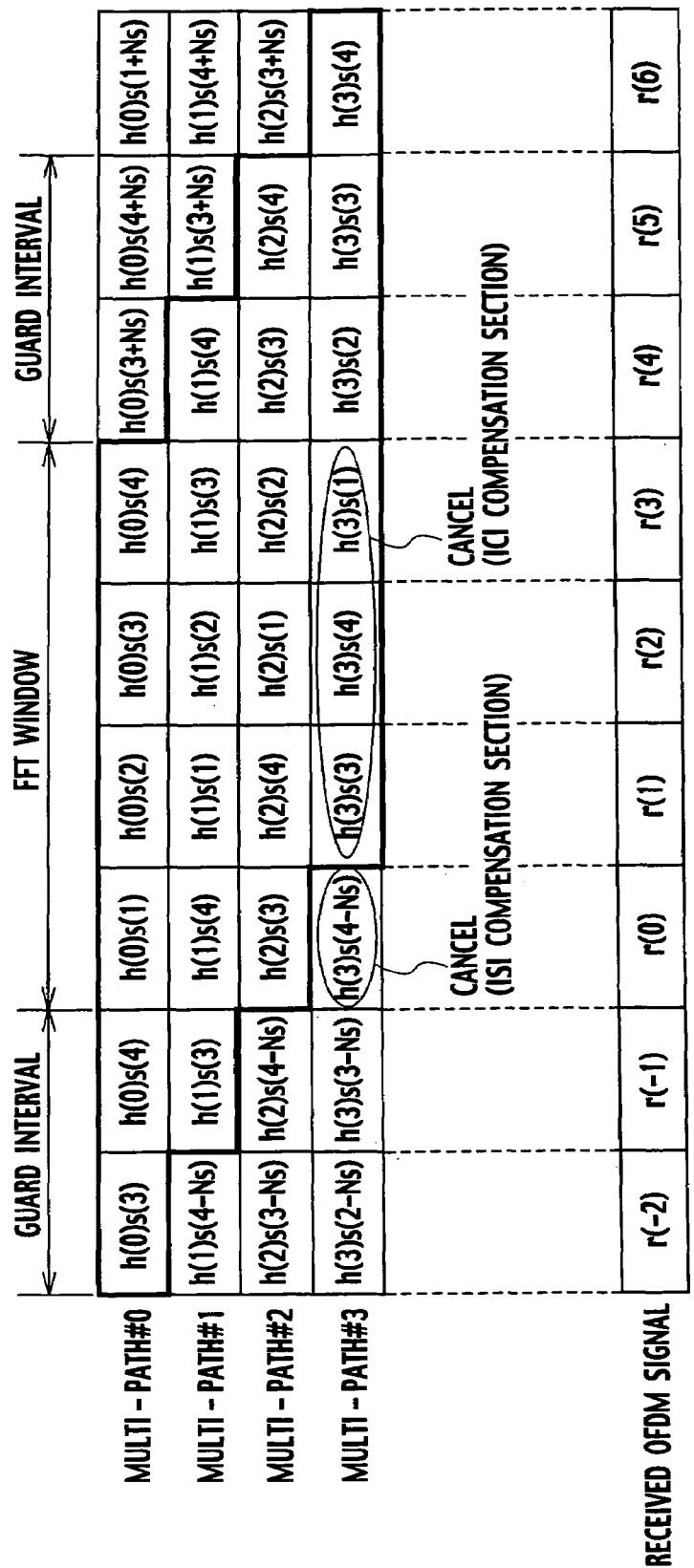
FIG. 8 is a diagram showing an example of an OFDM signal after compensation by the ISI compensation section and the ICI compensation section of the OFDM receiver according to the conventional technology 2.
Figure 9:
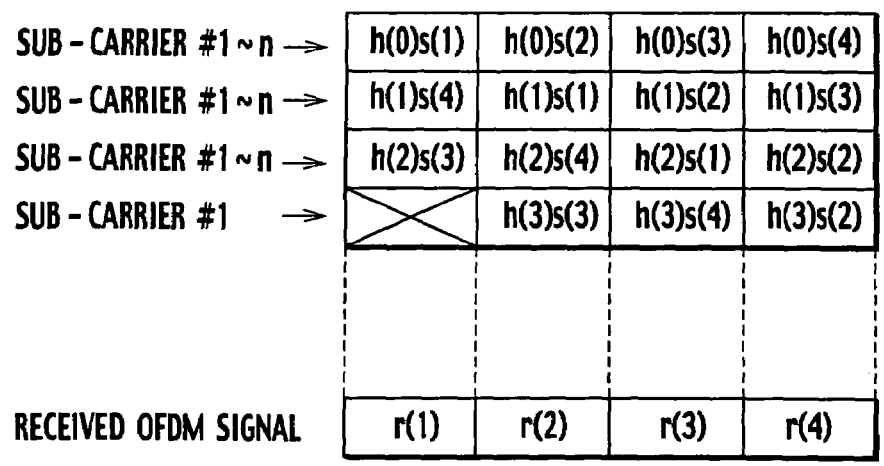
FIG. 9 is a diagram showing an example of a signal component contained in a signal output from a guard interval removal section of the OFDM receiver according to the conventional technology 2.

In the example of FIG. 8, based on the impulse response length from the channel estimation section 208, the ICI component selection section 403 extracts a multi-path #3 which does not become a form (including a cyclically shifted form) containing signal components "s(1) to s(4)" only which constitute a target symbol in the FFT window set as described above.

Subsequently, the ICI component selection section 403 selects the signal components "s(3), s(4) and s(1)" in the FFT window of the OFDM signal received through the multi-path #3, as signal components likely to cause inter-carrier interference, and outputs the signal components "s(3), s(4) and s(1)" to the channel simulator section 404.

The channel simulator section 404 is configured to convolute a channel impulse response in the inter-carrier interference signal components from the ICI component selection section 403 based on the channel estimated value from the channel estimation section 208, so as to obtain replicas indicating interference signal components to be canceled, and to output the replicas to the subtraction section 405.

In the example of FIG. 8, the channel simulator section 404 obtains replicas "h(3)s(3), h(3)s(4) and h(3)s(1)" by convoluting the channel impulse response of the multi-path #3 in the inter-carrier interference signal components "s(3), s(4) and s(1)" from the ICI component selection section 403, so as to output the replicas "h(3)s(3), h(3)s(4) and h(3)s(1)" to the subtraction section 405.

According to the first embodiment, the ICI component selection section 403 and the channel simulator section 404 constitute a replica generation section which generates replicas constituted of signal components causing inter-carrier interference and containing all sub-carrier components, based on a transmission signal estimated value and a channel estimated value of each multi-path.

The subtraction section 405 is configured to obtain a signal by subtracting the replicas (e.g., "h(3)s(3), h(3)s(4) and h(3)s(1)") from the channel simulator section 404, from the OFDM signal after ISI compensation, and to output the obtained signal to the guard interval removal section 406.

The guard interval removal section 406 is configured to remove a guard interval from the signal sent from the subtraction section 405, and to output the signal to the FFT section 408.

Incidentally, as shown in FIG. 11, different from the case of the OFDM receiver 200 of the conventional technology 2, the signals output from the guard interval removal section 406 contain signal components "h(0)s(1) to h(0)s(4)", "h(1)s(1) to h(1)s(4)", and "h(2)s(2) to h(2)s(4)" only. No signal components "h(3)s(3), h(3)s(4) and h(3)s(1)" regarding the signals received through the multi-path #3 are contained at all.

The FFT section 408 is configured to execute FFT processing for the OFDM signal output from the guard interval removal section 406 based on the FFT window used by the OFDM transmitter 100, so as to calculate a signal of a frequency domain (OFDM signal after ICI compensation), and to output the calculated signal to a linear filter section 202.

The ICI compensation section 400 of the OFDM receiver 200 of the first embodiment is generally configured not to take an OFDM signal received through the multi-path #3 into an OFDM signal after ICI compensation, based on the fact that power of the signal component causing inter-carrier interference, i.e., the OFDM signal received through the multi-path #3, is very small.

According to the configuration of the ICI compensation section 400 of the OFDM receiver 200 of the first embodiment, since a replica needs not be generated for each sub-carrier, it is possible to reduce the amount of processing for executing ICI compensation.

According to the configuration of the ICI compensation section 400 of the OFDM receiver 200 of the first embodiment, because of the fact that the power of the signal component of the OFDM signal received through the multi-path #3 is small, the information signal can be reproduced with almost no influence on frame error rate characteristics or bit error rate characteristics. Since ICI compensation processing needs not be executed for each sub-carrier, the FFT processing can be used. Thus, it is possible to reduce the amount of processing and to achieve a high speed.

Furthermore, the OFDM receiver 200 of the first embodiment may be configured to operate the ICI compensation section 400 of the first embodiment, when the ICI compensation section 400 of the conventional technology 2 is present side by side with the ICI compensation section 400 of the first embodiment, and when the power of the OFDM signal containing a signal component causing inter-carrier interference and received through the multi-path #3 becomes equal to or lower than a predetermined threshold.

Second Embodiment

A second embodiment of the present invention will be described with reference to FIGS. 12 to 15. Hereinafter, differences of an OFDM receiver 200 of the second embodiment from that of the first embodiment will mainly be explained. The OFDM receiver 200 of the second embodiment is similar in configuration to the OFDM receiver 200 of the conventional technology 2 except an ICI compensation section 400. Thus, a configuration of the ICI compensation section 400 of the OFDM receiver 200 of the second embodiment will be described hereinafter.

Figure 12:
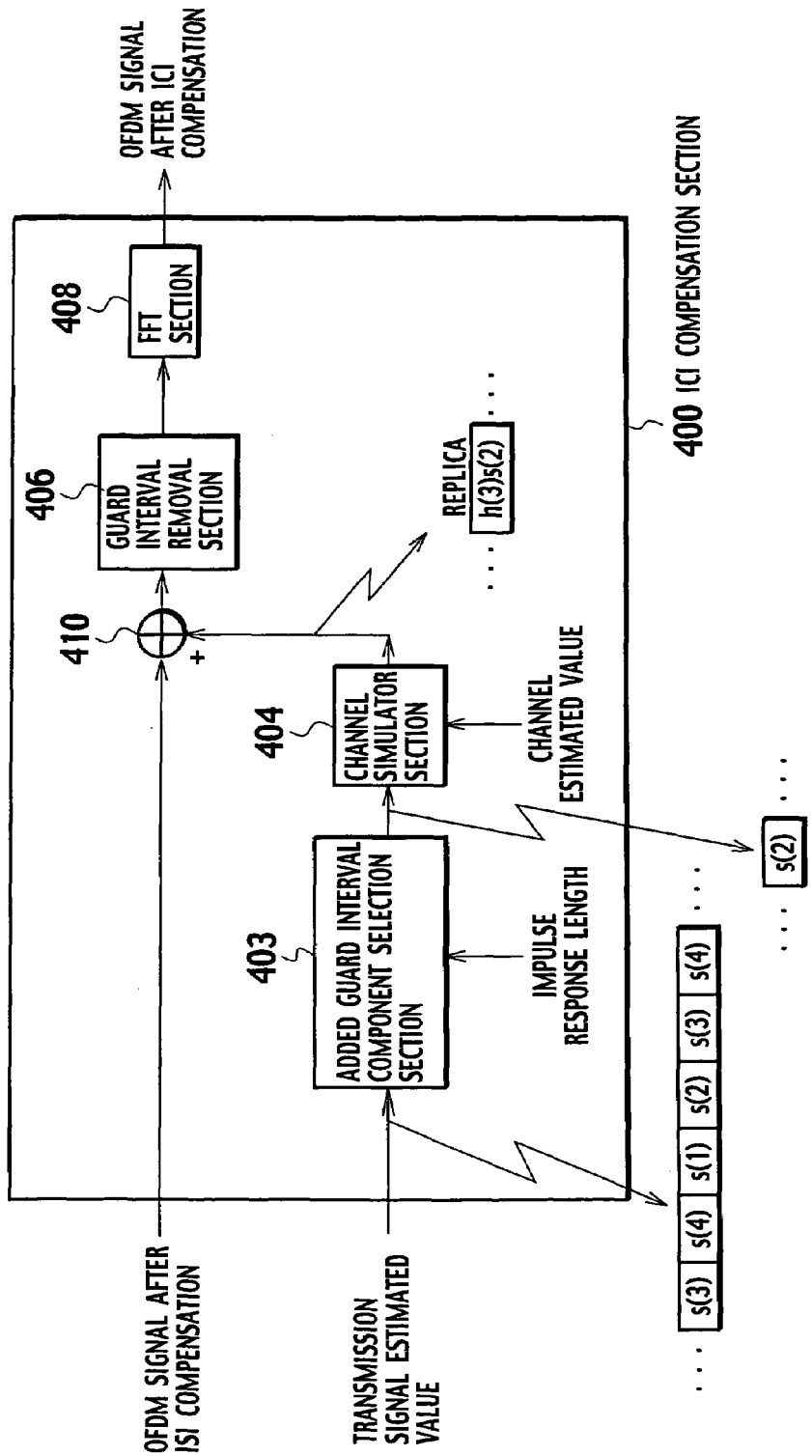
FIG. 12 is a functional block diagram of an ICI compensation section of an OFDM receiver according to a second embodiment of the present invention.

As shown in FIG. 12, the ICI compensation section 400 of the second embodiment includes an added guard interval component selection section 409, a channel simulator section 404, an addition section 410, a guard interval removal section 406, and an FFT section 408.

Figure 13:
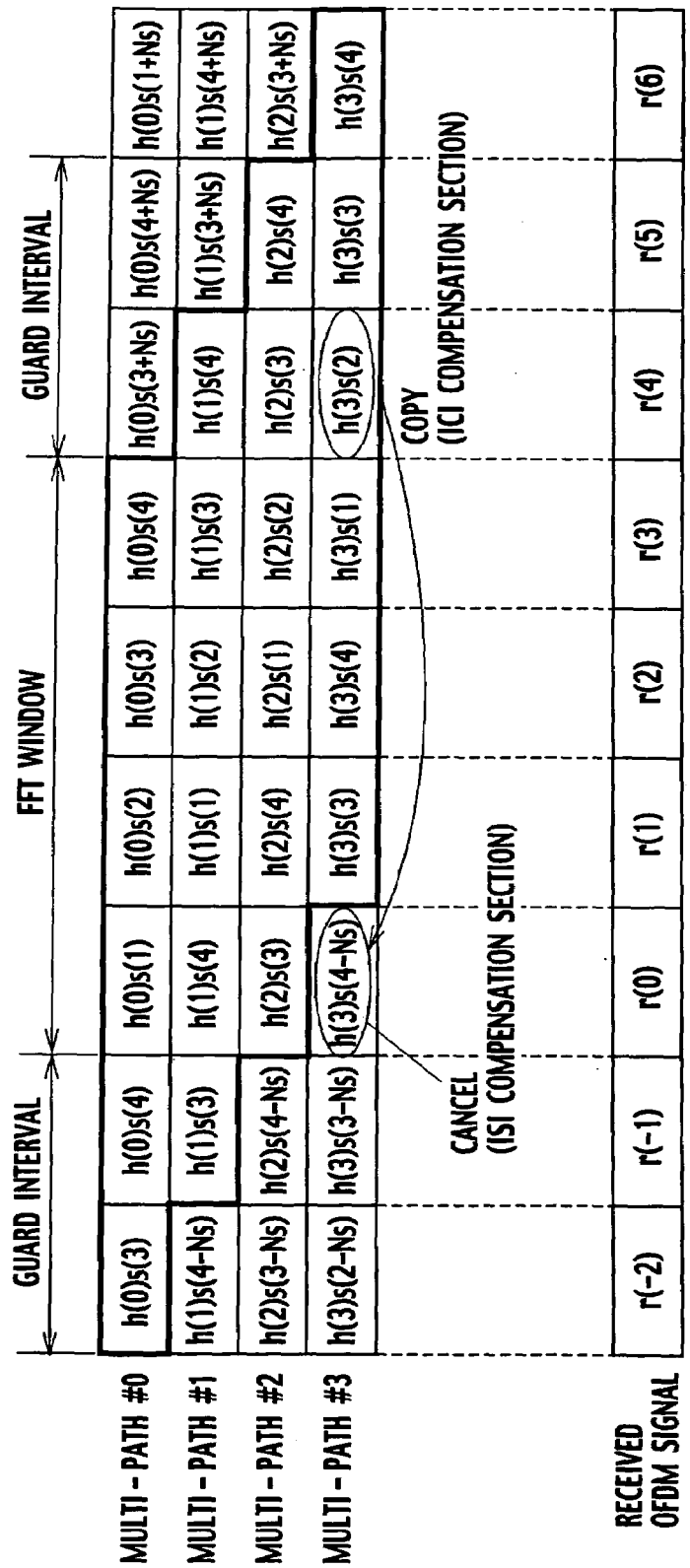
FIG. 13 is a diagram illustrating a concept of the OFDM receiver according to the second embodiment of the present invention.

Based on an impulse response length from a channel estimation section 208, the added guard interval component selection section 409 is configured to select signal components likely to cause inter-carrier interference (in example of FIG. 13, signal components "s(3), s(4) and s(1)" in an OFDM signal received through a multi-path #3) from among transmission signal estimated values from a transmission signal estimated value obtaining section 207.

That is, the added guard interval component selection section 409 is configured to extract signal components (in the example of FIG. 13, signal components "s(3) to s(4) and s(1)" of the OFDM signal received through the multi-path #3) in an FFT window corresponding to a target symbol in the OFDM signal received through a multi-path (in the example of FIG. 13, the multi-path #3) which does not become a form (including a cyclically shifted form) containing signal components "s(1) to s(4)" only which constitute the target symbol in the FFT window set as described above.

Subsequently, the added guard interval component selection section 409 is configured to select a signal component (in the example of FIG. 13, "s(2)") constituting the target symbol in the OFDM signal together with the signal components (in the example of FIG. 13, signal components "s(3), s(4) and s(1)" in the OFDM signal received through the multi-path #3) causing inter-carrier interference in the FFT window, and to output the signal components to the channel simulator section 404.

The channel simulator section 404 is configured to convolute a channel impulse response in the signal components from the added guard interval component selection section 409, based on the channel estimated value from the channel estimation section 208, so as to obtain replicas indicating omitted signal components of the target symbol in the FFT window, and to output the replicas to the addition section 410.

In the example of FIG. 13, the channel simulator section 404 obtains a replica "h(3)s(2)" by convoluting the channel impulse response of the multi-path #3 in the signal components "s(2)" from the added guard interval component selection section 409, and outputs the replica to the addition section 410.

According to the second embodiment, the added guard interval component selection section 409 and the channel simulator section 404 constitute a replica generation section which generates replicas constituted of signal components constituting the target symbol in the OFDM signal together with signal components causing inter-carrier interference, based on a transmission signal estimated value and a channel estimated value of each multi-path.

The addition section 410 is configured to obtain an OFDM signal by adding the replicas (e.g., "h(3)s(2)") from the channel simulator section 404 to the OFDM signal after ISI compensation, and output the OFDM signal to the guard interval removal section 406.

Next, referring to FIGS. 13 to 15, a concept of the OFDM receiver 200 of the embodiment will be described.

As shown in FIG. 13, first, signal components "h(3)s(4–Ns)" causing inter-carrier interference are removed by the ISI compensation section 300 as in the case of the OFDM receiver 200 of the conventional technology 2.

Second, in place of removing the signal components "h(3)s(3), h(3)s(4) and h(3)s(1)" causing inter-carrier interference, the ICI compensation section 400 copies the signal component "h(3)s(2)" constituting the target symbol together with the inter-carrier interference signal components in the FFT widow set as described above, from a guard interval portion of a subsequent symbol.

Then, the ICI compensation section 400 adds the copied signal components to the "h(3)s(4–Ns)" removed portion in the FFT window, whereby orthogonality can be maintained between carriers in the FFT window.

Figure 14:
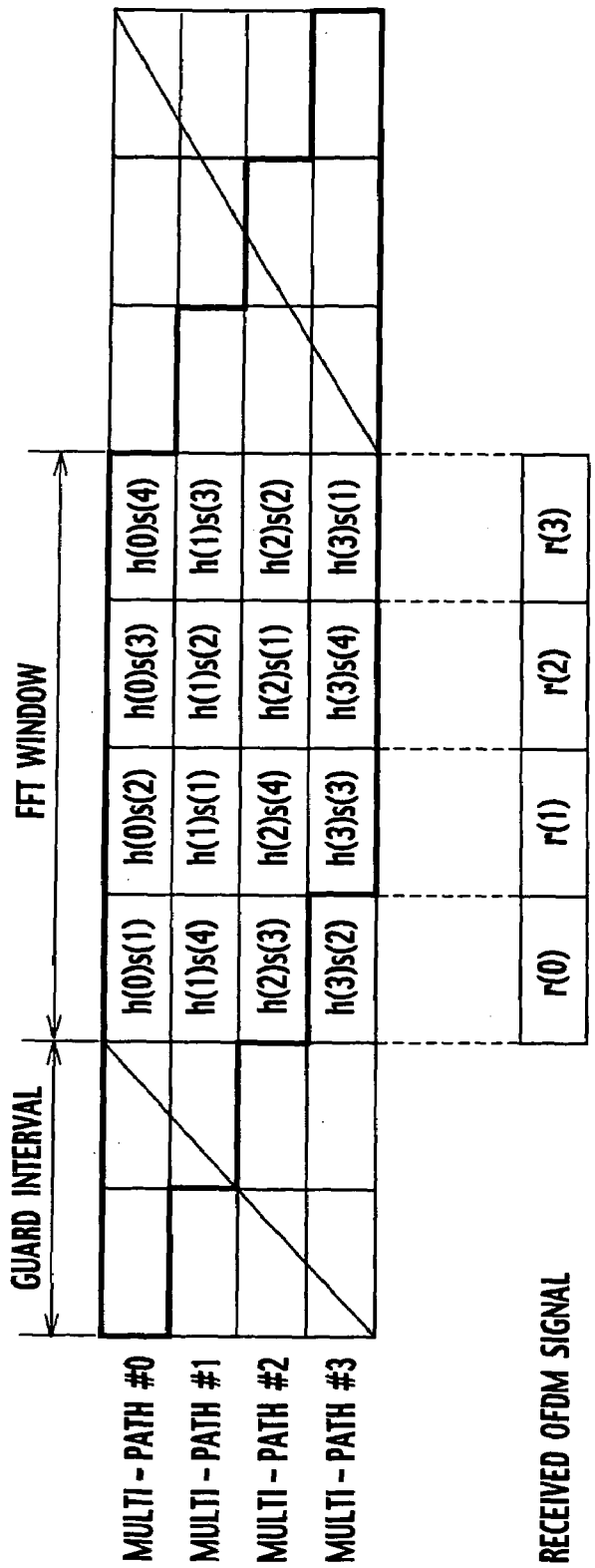
FIG. 14 is a diagram showing a signal component of an OFDM signal after ICI compensation by the ICI compensation section of the OFDM receiver according to the second embodiment of the present invention.

FIG. 14 shows signal components of the OFDM signal after ICI compensation when ICI compensation processing is ideally carried out by the ICI compensation section 410 of the second embodiment. FIG. 15 shows signal components of a received signal when a guard interval length is "3".

Figure 15:
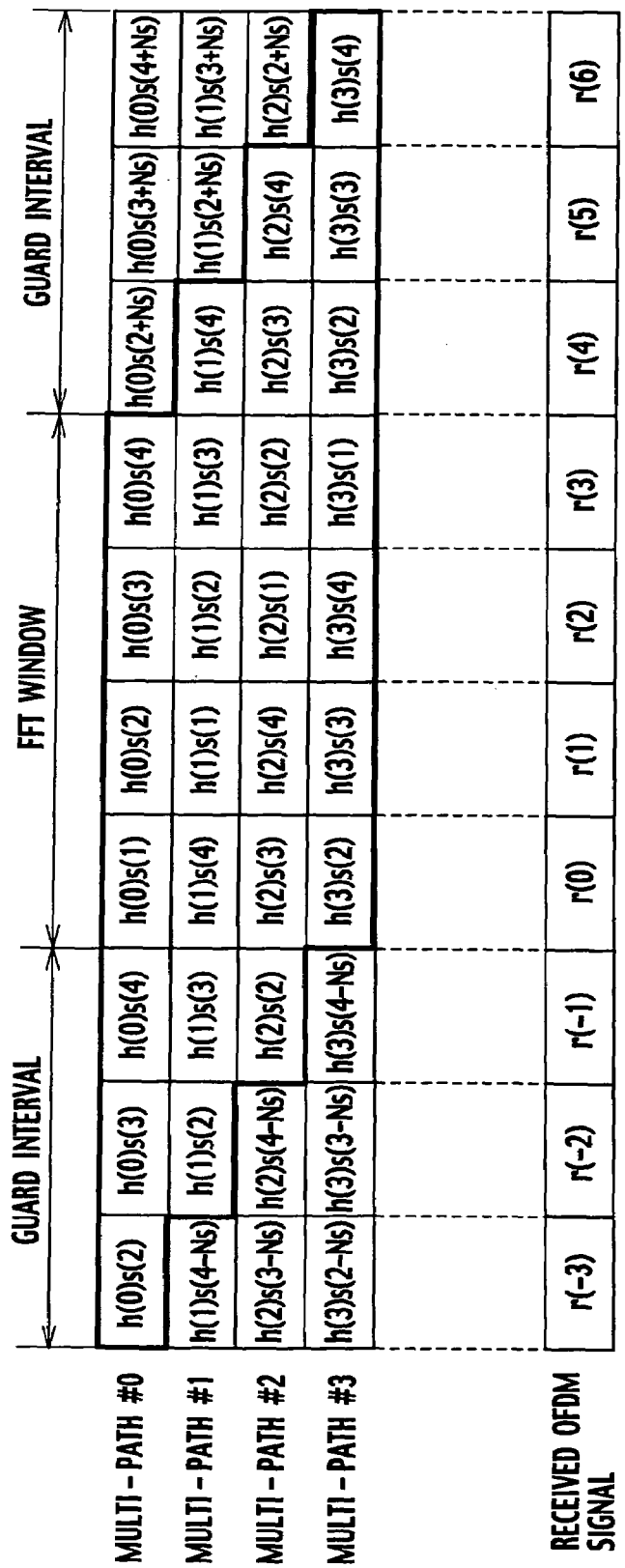
FIG. 15 is a diagram showing a signal component of an OFDM signal when a guard interval length is "3"

As apparent from FIGS. 14 and 15, when the ICI compensation processing is ideally carried out by the ICI compensation section 400 of the second embodiment, signal components of the OFDM signal after the ICI compensation become equal to those of the OFDM signal when the guard interval length is "3".

The OFDM receiver 200 of the second embodiment is advantageous over that of the conventional technology 2 in that it is difficult to be influenced by an error of a channel estimated value in addition to a reduction in the amount of calculation.

For example, when the number of FFT points is "64", a guard interval length is "4", and a channel response length is "6", the number of replicas generated by the ICI compensation section 400 is "6" in the case of the OFDM receiver 200 of the second embodiment while it is "128" in the case of the OFDM receiver 200 of the conventional technology 2.

Furthermore, in the OFDM receiver 200 of the conventional technology, since the number of replicas subtracted from the OFDM signal after the ISI compensation is large, the ICI compensation section 400 is easily influenced by a channel estimation error.

On the other hand, in the OFDM receiver 200 of the second embodiment, since the number of replicas added to the OFDM signal after the ISI compensation is small, the ICI compensation section 400 is difficult to be influenced by a channel estimation error.

MODIFIED EXAMPLE 1

Figure 16:
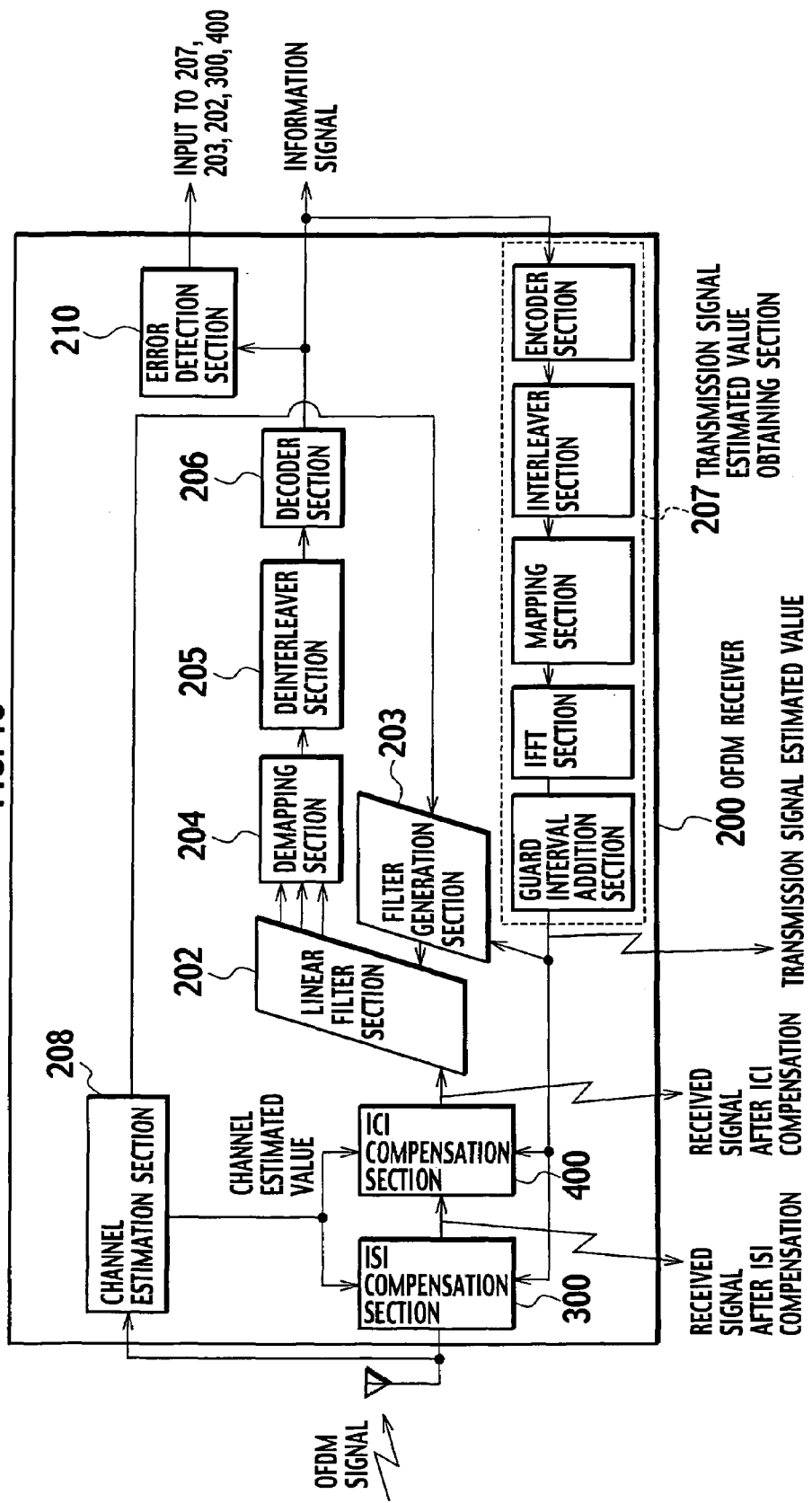
FIG. 16 is a functional block diagram of an OFDM receiver according to a modified example 1.

The OFDM receiver 200 of each of the first and second embodiments may employ a configuration similar to that shown in FIG. 16.

Specifically, as shown in FIG. 16, the OFDM receiver 200 includes an error detection section 210 in addition to the components of the OFDM receiver 200 of each of the first and second embodiments.

The OFDM receiver 200 of the modified example 1 is configured to control operations and stops of the ISI compensation section 300 and the ICI compensation section 400 (e.g., the added guard interval component selection section 409, the channel simulator section 404, and addition section 410), based on an error detection result of the OFDM signal using a cyclic redundancy code (CRC) or the like.

The error detection section 210 is configured to detect presence of an error for an error correction decoded information signal (information bit string) output from the decoder section 206 by using an error detection code added by the OFDM transmitter 100.

The error detection section 210 is configured to output the error detection result, to the liner filter section 202, the filter generation section 203, the transmission signal estimated value obtaining section 207, the ISI compensation section 300, and the ICI compensation section 400.

The linear filter section 202, the filter generation section 203, the transmission signal estimated value obtaining section 207, the ISI compensation section 300, and the ICI compensation section 400 are configured to execute processing of each section again when there is an error, and to stop such processing when there is no error.

The linear filter section 202, the filter generation section 203, the transmission signal estimated value obtaining section 207, the ISI compensation section 300, and the ICI compensation section 400 may be configured to stop the processing if the number of repeating times exceeds a fixed number of times (preset) even when an error is detected, and to execute processing such as sending of a retransmission request to the OFDM transmitter 100 or the like.

Figure 17:
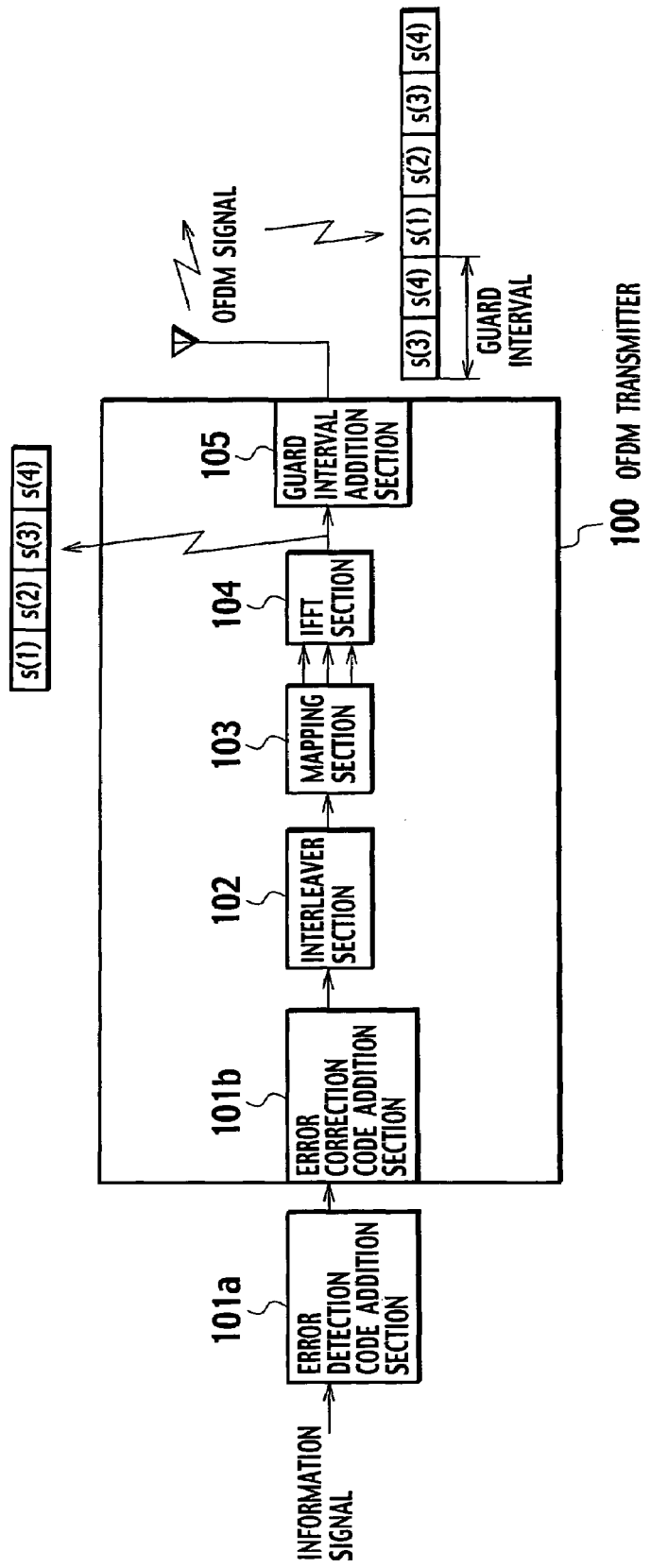
FIG. 17 is a functional block diagram of an OFDM transmitter according to the modified example 1.

Incidentally, as shown in FIG. 17, a configuration of the OFDM transmitter 100 corresponding to the OFDM receiver 200 of the modified example 1 includes an error detection code addition section 101a and an error correction code addition section 101b, in place of the encoder section 101 of the configuration of the conventional OFDM receiver 100.

The error detection code addition section 101a is configured to add an error detection code to an input information signal. For the error detection code, generally, CRC is often used.

The error correction code addition section 101b is configured to execute error correction encoding processing for the error detection code added information signal output from the error detection code addition section 101a.

Third Embodiment

A third embodiment of the present invention will be described with reference to FIGS. 18 to 21. Hereinafter, differences of an OFDM receiver 200 of the third embodiment from that of the first embodiment will mainly be explained.

Figure 18:
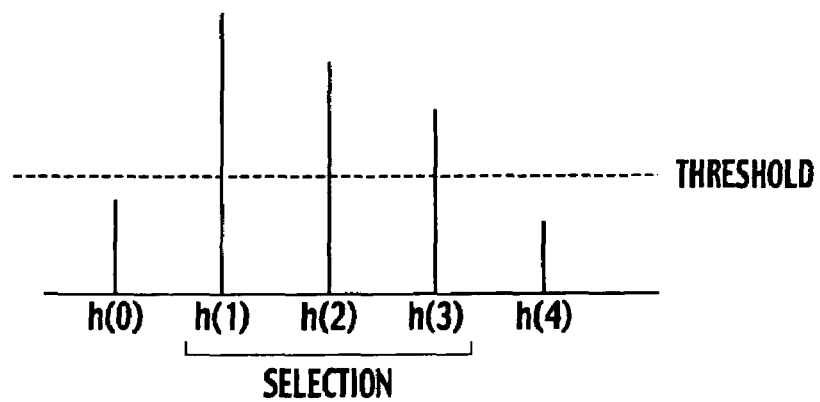
FIG. 18 is a diagram illustrating a method of setting an FFT window in an OFDM receiver according to a third embodiment of the present invention.
Figure 19:
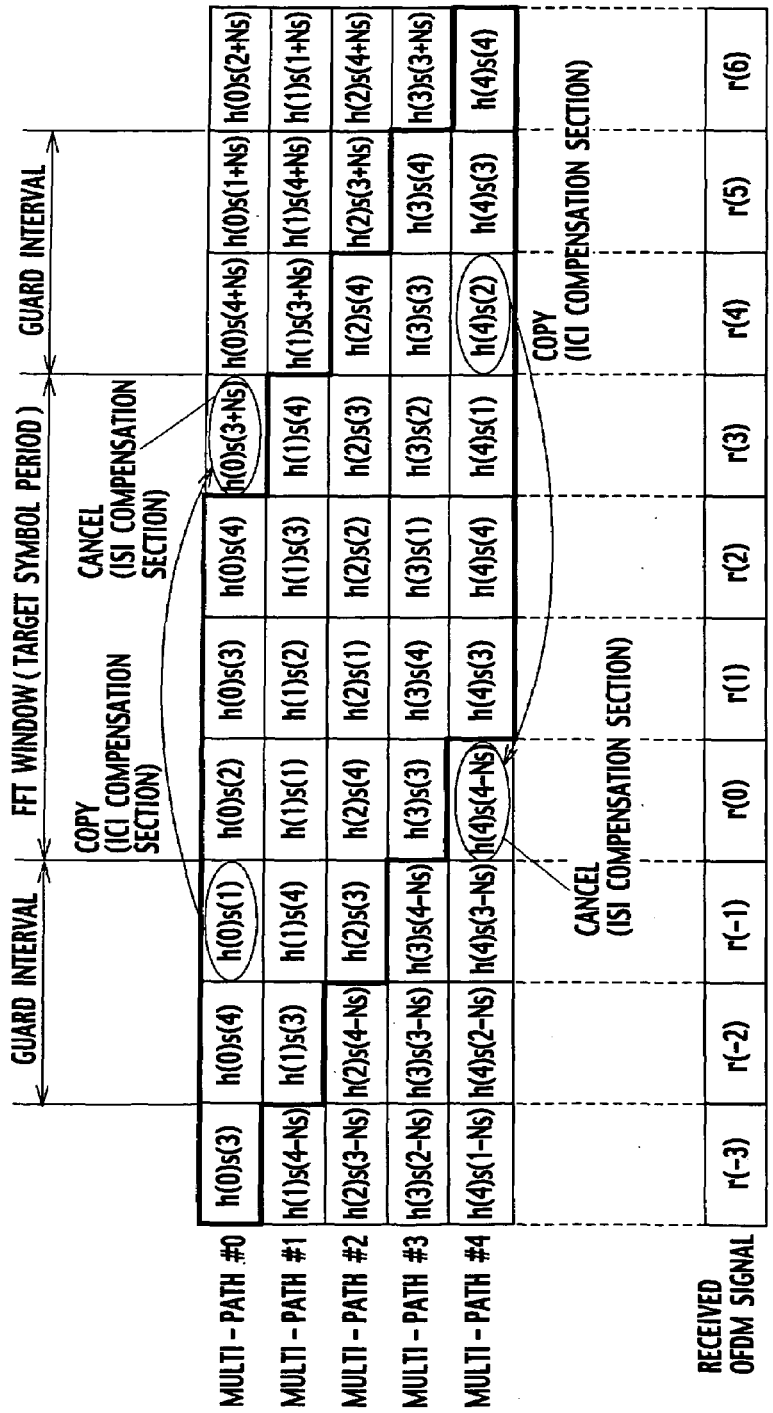
FIG. 19 is a diagram showing a signal component after ICI compensation by an ICI compensation section of the OFDM receiver according to the third embodiment of the present invention.

The OFDM receiver 200 of the third embodiment is configured to preferentially select a multi-path which receives an OFDM signal of power of a predetermined value or high as shown in FIG. 18, and to set an FFT window so as to contain all signal components of the OFDM signal received through the selected multi-path as shown in FIG. 19.

In this case, a signal component of an OFDM signal received through a multi-path #0 and a signal component of an OFDM signal received through a multi-path #4 may cause inter-symbol interference and inter-carrier interference.

That is, in such a case, a first signal component "h(0)s(1)" constituting a target symbol in the OFDM signal together with signal components "h(0)s(2), h(0)s(3) and h(0)s(4)" which cause first inter-carrier interference is contained in a symbol period before a target symbol period.

And, a second signal component "h(4)s(2)" constituting the target symbol in the OFDM signal together with signal components "h(4)s(3), h(4)s(4) and h(4)s(1)" is contained in a symbol period after the target symbol period.

Figure 20:
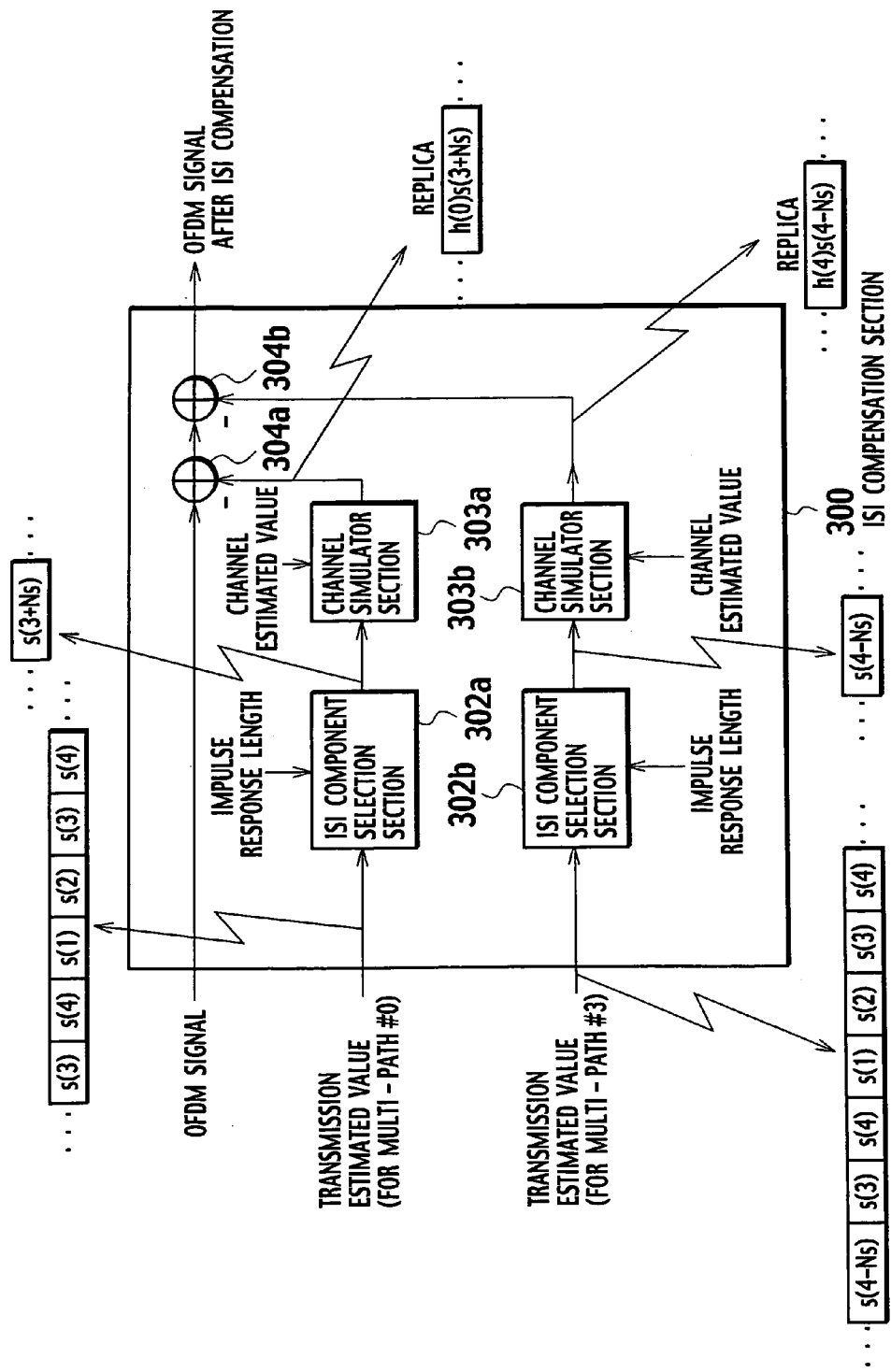
FIG. 20 is a functional block diagram of an ISI compensation section of the OFDM receiver according to the third embodiment of the present invention.

As shown in FIG. 20, an ISI compensation section 300 of the third embodiment includes two ISI component selection sections 302a and 302b, two channel simulator sections 303a and 303b, and two subtraction sections 304a and 304b.

The ISI compensation section 300 is configured to prevent inter-symbol interference caused by the signal component of the OFDM signal received through the multi-path #0, by the ISI component selection section 302a, the channel simulator section 303a, and the subtraction section 304a.

And, the ISI compensation section 300 is configured to prevent inter-symbol interference caused by the signal component of the OFDM signal received through the multi-path #3, by the ISI component selection circuit 302b, the channel simulator section 303b, and the subtraction section 304b.

Specifically, based on an impulse response length from a channel estimation section 208, the ISI component selection section 302a is configured to select a signal component "s(3+Ns)" constituting a symbol after target symbol from among transmission signal estimated values from a transmission signal estimated value obtaining section 207, as a signal component causing inter-symbol interference, and to output the signal component to the channel simulator section 303a. Here, the signal component "s(3+Ns)" is received in the target symbol period (FFT window).

The channel simulator section 303a is configured to convolute a channel impulse response of the multi-path #0 in the signal component "s(3+Ns)" from the ISI component selection section 302a, so as to obtain a replica "h(0)s(3+Ns)", and to output the replica to the subtraction section 304a.

The subtraction section 304a is configured to subtract the replica ("h(0)s(3+Ns)" in an example of FIG. 19) output from the channel simulator section 303a, from a received signal, and to output the result to the subtraction section 304b.

On the other hand, based on an impulse response length from a channel estimation section 208, the ISI component selection section 302b is configured to select a signal component "s(4−Ns)" of a symbol before the target symbol from among the transmission signal estimated values from the transmission signal estimated value obtaining section 207, as a signal component causing inter-symbol interference, and to output the signal component to the channel simulator section 303b. Here, the inter-symbol interference signal component "s(4−Ns)" is received in the target symbol period (FFT window).

The channel simulator section 303b is configured to convolute a channel impulse response of the multi-path #4 in the signal component "s(4−Ns)" from the ISI component selection section 302b, so as to obtain a replica "h(4)s(4−Ns)", and to output the replica to the subtraction section 304b.

The subtraction section 304b is configured to subtract the replica (in the example of FIG. 19, "h(4)s(4−Ns)") output from the channel simulator section 303b, from the signal output from the subtraction section 304a, so as to obtain an OFDM signal after ISI compensation, and to output the OFDM signal after ISI compensation to the ICI compensation section 400.

Figure 21:
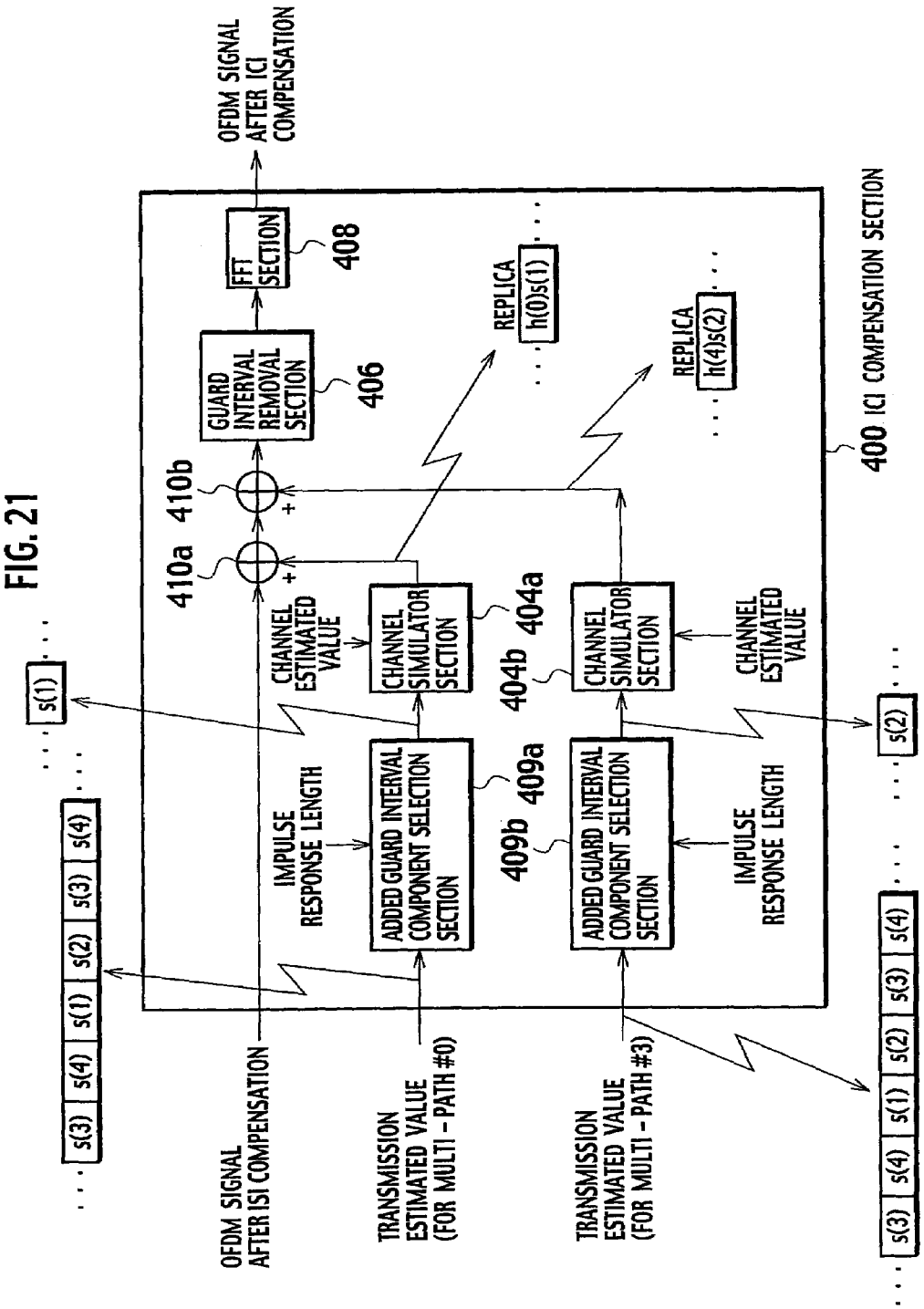
FIG. 21 is a functional block diagram of the ICI compensation section of the OFDM receiver according to the third embodiment of the present invention.

As shown in FIG. 21, the ISI compensation section 400 of the third embodiment includes two added guard interval component selection sections 409a and 409b, two channel simulator sections 404a and 404b, two addition sections 410a and 410b, a guard interval removal section 406, and an FFT section 408.

The ISI compensation section 400 is configured to prevent inter-carrier interference caused by the signal component of the OFDM signal received through the multi-path #0, by the added guard interval component selection section 409a, the channel simulator section 404a, and the addition section 410a.

And, the ISI compensation section 400 is configured to prevent inter-carrier interference caused by the signal component of the OFDM signal received through the multi-path #4 by the added guard interval component selection circuit 409b, the channel simulator section 404b, and the addition section 410b.

Based on an impulse response length from the channel estimation section 208, the added guard interval component selection section 409a is configured to select signal components causing inter-carrier interference (in the example of FIG. 19, signal components "s(2), s(3) and s(4)" of an OFDM signal received through the multi-path #0) from among transmission signal estimated values from the transmission signal estimated value obtaining section 207.

That is, the added guard interval component selection section 409a is configured to extract signal components (in the example of FIG. 19, "s(2), s(3) and s(4)" of the OFDM signal received through the multi-path #0) in the FFT window corresponding to the target symbol in the OFDM signal received through a multi-path (in the example of FIG. 19, multi-path #0) which does not become a form (including a cyclically shifted form) containing signal components "s(1) to s(4)" constituting the target symbol in the FFT window set as described above.

Subsequently, the added guard interval component selection section 409a is configured to select a signal component (in the example of FIG. 19, "s(1)") constituting the target symbol in the OFDM signal together with the signal components causing inter-carrier interference (in the example of FIG. 19, the signal components "s(2), s(3) and s(4)" in the OFDM signal received through the multi-path #0) in the FFT window, and to output the selected signal component to the channel simulator section 404a.

The channel simulator section 404a is configured to convolute a channel impulse response in the signal component "s(1)" from the added guard interval component selection section 409a, based on the channel estimated value from the channel estimation section 208, so as to obtain a replica "h(0)s(1)" indicating a target symbol omitted signal component in the FFT window, and to output the replica "h(0)s(1)" to the addition section 410a.

The addition section 410a is configured to output a signal obtained by adding the replica ("h(0)s(1)" output from the channel simulator section 404a) to the OFDM signal after the ISI compensation to the addition section 410b.

On the other hand, based on an impulse response length from the channel estimation section 208, the added guard interval component selection section 409b is configured to select signal components causing inter-carrier interference (in the example of FIG. 19, signal components "s(3), s(4) and s(1)" in the OFDM signal received through the multi-path #4) from among the transmission signal estimated values from the transmission signal estimated value obtaining section 207.

That is, the added guard interval component selection section 409b is configured to extract signal components (in the example of FIG. 19, "s(3), s(4) and s(1)" of the OFDM signal received through the multi-path #4) in the FFT window corresponding to the target symbol in the OFDM signal received through a multi-path (in the example of FIG. 19, multi-path #4) which does not become a form (including a cyclically shifted form) containing signal components "s(1) to s(4)" constituting the target symbol in the FFT window set as described above.

Subsequently, the added guard interval component selection section 409a is configured to select a signal component (in the example of FIG. 19, "s(2)") constituting the target symbol in the OFDM signal together with the signal components causing inter-carrier interference (in the example of FIG. 19, the signal components "s(3), s(4) and s(1)" in the OFDM signal received through the multi-path #4) in the FFT window, and to output the selected signal component to the channel simulator section 404b.

The channel simulator section 404b is configured to convolute a channel impulse response in the signal component "s(2)" from the added guard interval component selection section 409b, based on the channel estimated value from the channel estimation section 208, so as to obtain a replica "h(3)s(2)" indicating a target symbol omitted signal component in the FFT window, and to output the replica "h(3)s(2)" to the addition section 410b.

The addition section 410b is configured to obtain a signal by adding the replica ("h(3)s(2)") output from the channel simulator section 404b to the signal from the addition section 410a, and to output the obtained signal to the guard interval removal section 406.

When signal components constituting previous and subsequent symbols are contained in the FFT window of the target symbol as in the above example, the amount of processing increases compared with a case in which a signal component constituting one of previous and subsequent symbols is contained in a target symbol period (FFT window) as in the case of the second embodiment.

Thus, in the OFDM receiver 200 of the third embodiment, the FFT window of the target symbol is preferably set to contain a signal component only constituting one of previous and subsequent symbols therein as much as possible.

That is, the FFT window used at FFT section 408 is preferably set so that a signal component constituting the target symbol in the OFDM signal together with a signal component causing inter-carrier interference can be contained in one of a symbol period before the target symbol period and a symbol period after the same.

However, since impossibility of setting the FFT window in such a manner can be considered, the OFDM receiver 200 of the third embodiment may be configured to notify a setting result of the FFT window to the ISI compensation section 300 and the ICI compensation section 400.

Here, the setting result of the FFT window contains inclusion of signal components constituting previous and subsequent symbols (setting result 1), inclusion of the signal component only of the previous symbol (setting result 2), and inclusion of the signal component only of the subsequent symbol (setting result 3) in the FFT window of the target symbol.

In such a case, the ISI compensation section 300 is configured to operate both of the ISI component selection section 302a, the channel simulator section 303a and the subtraction section 304a (system "a"), and the ISI component selection section 302b, the channel simulator section 303b and the subtraction section 304b (system "b"), when the setting result 1 is received.

The ISI compensation section 300 is configured to operate the system "a" only when the setting result 2 is received. The ISI compensation section 300 is configured to operate the system "b" only when the setting result 3 is received.

Furthermore, the ICI compensation section 400 is configured to operate both of the added guard interval component selection section 409a, the channel simulator section 404a and the addition section 410a (system "a"), and the added guard interval component selection section 409b, the channel simulator section 404b and the addition section 410b (system b) when the setting result 1 is received.

The ICI compensation section 400 is configured to operate the system "a" only when the setting result 2 is received. The ICI compensation section 400 is configured to operate the system "b" only when the setting result 3 is received.

Fourth Embodiment

Figures 22A, 22B:
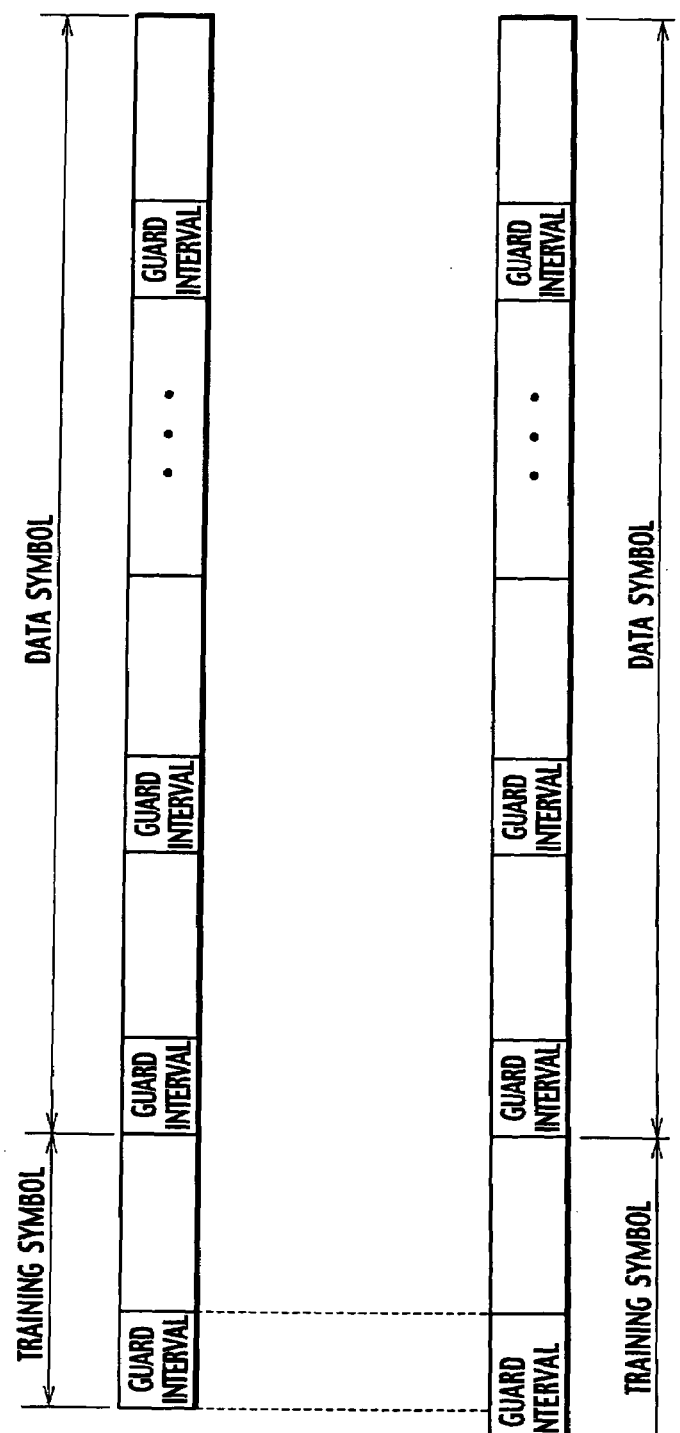
FIGS. 22A and 22B are diagrams showing frame structures used in an OFDM receiver according to a fourth embodiment of the present invention.

Referring to FIGS. 22A and 22B, description will be made of an OFDM receiver 200 according to a fourth embodiment of the present invention. FIG. 22A shows a frame structure of an OFDM signal used in the OFDM receiver 200 of the conventional technology, and FIG. 22B shows a frame structure of an OFDM signal used in the OFDM receiver 200 of the fourth embodiment.

As shown in FIG. 22A, in the frame structure of the OFDM signal used in the OFDM receiver 200 of the conventional technology, a guard interval length added to a training symbol (pilot symbol) is equal to that added to a data symbol.

In the OFDM receiver 200 of the present invention, an accurate channel estimated value must be obtained, in order to accurately execute ISI compensation processing and ICI compensation processing.

However, when the guard interval length including the training symbol is shorter than a channel impulse response length, channel estimation processing is influenced by inter-symbol interference and inter-carrier interference, so as to lower channel estimation accuracy.

Thus, as shown in FIG. 22B, the OFDM receiver 200 of the fourth embodiment is configured so that a guard interval length added to the training symbol can be longer than that added to a data symbol.

By employing such a frame structure, in the OFDM receiver 200 of the present invention, it is possible to improve channel estimation accuracy for the training symbol and to accurately execute ISI compensation processing and ICI compensation processing.

Incidentally, excessive addition of the guard interval to the training symbol leads to a considerable reduction in transmission efficiency. According to the fourth embodiment, the guard interval length added to the training symbol is preferably set to "(maximum number of compensation points)+α".

The "maximum number of compensation points" means the number of points considered to be compensated for in the OFDM receiver 200 of the present invention.

The maximum number of compensation points is a value set by considering the number of FFT points, the number of guard interval points, an encoding method, a processing amount permitted in a real receiver, a target communication quality or the like.

The guard interval length added to the training symbol is set to more than the "maximum number of compensation points" for the purpose of obtaining a good channel estimated value even when a filter is applied.

Fifth Embodiment

Figure 23:
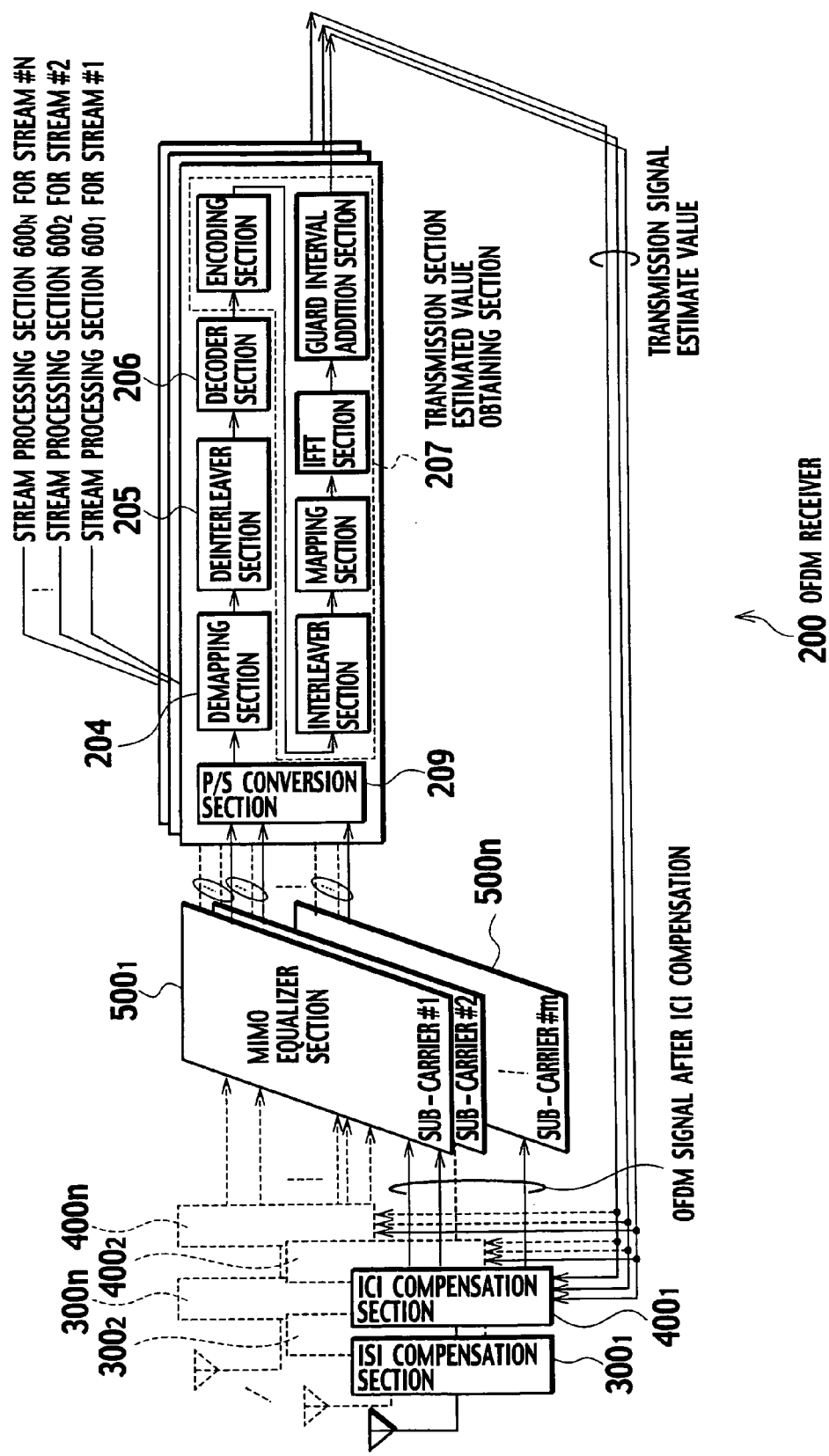
FIG. 23 is a functional block diagram of an OFDM receiver according to a fifth embodiment of the present invention.

Referring to FIG. 23, description will be made of an OFDM receiver 200 according to a fifth embodiment of the present invention.

According to the OFDM receiver 200 of the fifth embodiment, the ISI compensation section 300 and the ICI compensation section 400 of the foregoing embodiments are applied to a system which receives OFDM signals by using a plurality of antennas, or a multi-input multi-output (MIMO) system.

The OFDM receiver 200 of the fifth embodiment is configured to receive signals transmitted by a plurality of OFDM transmitters 100 simultaneously at the same frequency band.

As shown in FIG. 23, the OFDM receiver 200 of the fifth embodiment includes a plurality of ISI compensation sections $300_1$ to $300_n$, a plurality of ICI compensation sections $400_1$ to $400_n$, a plurality of MIMO equalizer sections $500_1$ to $500_n$, and a plurality of stream processing sections $600_1$ to $600_N$.

The plurality of ISI compensation sections $300_1$ to $300_n$ and the plurality of ICI compensation sections $400_1$ to $400_n$ are configured to execute ISI compensation processing and ICI compensation processing for OFDM signals transmitted simultaneously at the same frequency band by all the plurality of OFDM transmitters 100, by using the method described in one of the first to third embodiments.

The MIMO equalizer sections $500_1$ to $500_n$ are configured to execute equalizing processing for the OFDM signals after ICI compensation from the plurality of ICI compensation sections $400_1$ to $400_n$, to divide the signals into symbols of streams #1 to #N, and to output the symbols to the stream processing sections $600_1$ to $600_n$.

The MIMO equalizer sections $500_1$ to $500_n$ include any type of MIMO equalizers studied in D-BLAST or the like.

Each of the plurality of stream processing sections $600_1$ to $600_n$ includes a P/S conversion section 209, a demapping section 204, a deinterleaver section 205, a decoder section 206, and a transmission signal estimated value obtaining section 207.

The stream processing sections $600_1$ to $600_n$ are configured to reproduce information signals from the symbols of the streams #1 to #N.

Simulation Result

Hereinafter, description will be made of a simulation result of measuring the number of calculation times and FER characteristics necessary for compensation in the OFDM receiver 200.

According to the simulation, the numbers of calculation times and FER characteristics were measured in the case of no compensation processing, in the case of using compensation processing of the OFDM receiver 200 of the second embodiment, and in the case of using conventional compensation processing. Table 1 shows parameters used for the simulation.

TABLE 1

| | |
|---|---|
| Number of transmission antennas | 1 |
| Number of reception antennas | 2 |
| Channel | Equal level 15 path Reily channel |
| Channel estimation | Complete |
| Number of FFT points | 64 |
| Number of guard interval points | 5 |
| Maximum number of compensation points | 9 |
| FEC | Convolution code (encoding rate ½, bound length 7) |
| Number of in-frame symbols | 480 |
| Number of repeating times | 3 |

Figure 24:
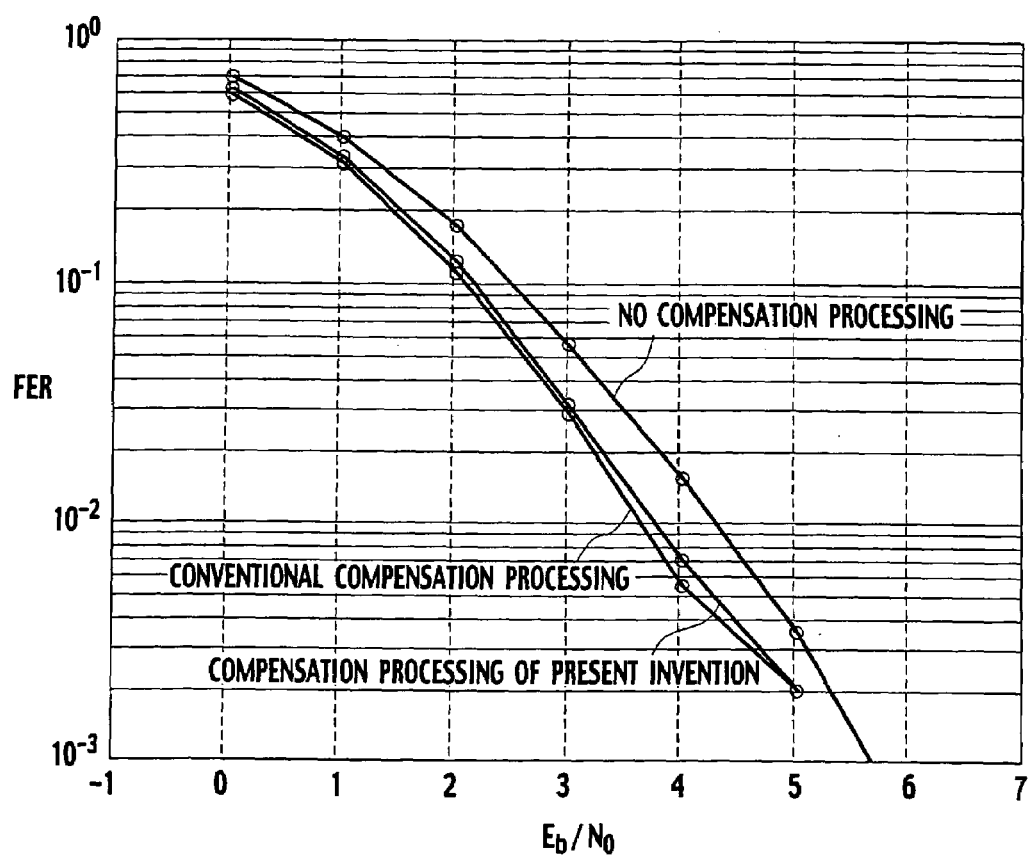
FIG. 24 is a diagram showing a simulation result which uses the OFDM receiver according to the second embodiment of the present invention.

Table 2 shows a comparison result of the numbers of calculation times of the cases. FIG. 24 shows a comparison result of FER characteristics of the cases.

TABLE 2

|  | Total number of calculating times |
|---|---|
| No compensation processing | 221184 |
| Compensation processing of present invention (second embodiment) | 908928 |
| Conventional compensation processing | 35769600 |

As shown in the Table 1 and FIG. 24, in the case of using the compensation processing of the OFDM receiver 200 of the second embodiment, FER characteristics can be improved compared with the case of no compensation processing.

Furthermore, as shown in the Table 2 and FIG. 24, in the case of using the compensation processing of the OFDM receiver 200 of the second embodiment, compared with the case of using the conventional compensation processing, almost no changes occur in FER characteristics even when the number of calculation times is reduced to $\frac{1}{40}$.

As described above, according to the present invention, it is possible to provide an OFDM receiver which can reduce the amount of processing for executing ICI compensation processing.

The present invention can set the FFT window (i.e., the present invention can extract the multi-path, as shown in the above embodiments), so that the number of created replicas is minimized, or the total power of the received signal components in the ICI components and the ISI components is maximized.

Additional advantages and modifications will readily occur to those skilled in the art. Therefore, the present invention in its broader aspects is not limited to the specific details and the representative embodiment shown and described herein. Accordingly, various modifications may be made without departing from the scope of the general inventive concept as defined by the appended claims and their equivalents.

What is claimed is:

1. An OFDM receiver which receives an OFDM signal transmitted from an OFDM transmitter by using a sub-carrier, the OFDM receiver comprising:
    a channel estimator configured to obtain a channel estimated value of each of a plurality of multi-paths based on the OFDM signal received through the plurality of multi-paths;
    a transmission signal estimated value calculator configured to calculate a transmission signal estimated value for each of the plurality of multi-paths as estimated values of the OFDM signal; and
    an inter-carrier interference compensator configured to set an FFT window indicating an interval which is a target for which FFT processing is executed so as to contain a signal component of previous and subsequent symbols different from a target symbol based on the transmission signal estimated value and the channel estimated value of each of the plurality of multi-paths, and to compensate for inter-carrier interference in the OFDM signal in the time domain based on signal components corresponding to all sub-carriers of the each of the plurality of multi-paths in the FFT window.

2. The OFDM receiver according to claim 1, wherein the inter-carrier interference compensator comprises:
    an inter-carrier interference signal component selector configured to set the FFT window indicating the interval which is the target for which the FFT processing is executed so as to contain the signal component of previous and subsequent symbols different from the target symbol based on the transmission signal estimated value and the channel estimated value of each of the plurality of multi-paths in the FFT window, and to select one or more inter-carrier interference signal components among signals corresponding to all the sub-carriers received through each of the plurality of multi-paths in the FFT window;
    a channel simulator configured to generate replicas constituted from the selected one or more inter-carrier interference signal components;
    a subtractor configured to subtract the replicas from the received OFDM signal; and
    a Fast Fourier Transformer configured to execute FFT processing for the replica-subtracted OFDM signal.

3. The OFDM receiver according to claim 1, wherein the inter-carrier interference compensator comprises:
    an inter-carrier interference signal component selector configured to set the FFT window indicating the interval which is the target for which the FFT processing is executed so as to contain the signal component of previous and subsequent symbols different from the target symbol based on the transmission signal estimated value and the channel estimated value of each of the plurality of multi-paths to select one or more inter-carrier interference signal components among signals corresponding to all the sub-carriers received through each of the plurality of multi-paths in the FFT window, and to select a signal different from the one or more selected inter-carrier interference signal components as an omitted signal in the FFT window;
    a channel simulator configured to generate replicas constituted from the selected omitted signal;
    an adder configured to add the replicas to the received OFDM signal; and
    a Fast Fourier Transformer configured to execute FFT processing for the replica-added OFDM signal.

4. The OFDM receiver according to claim 3, wherein an operation and a stop of the inter-carrier interference compensator are controlled based on an error detection result for the received OFDM signal.

5. The OFDM receiver according to claim 3, wherein
    when a first signal component constituting the target symbol together with a first inter-carrier interference signal component of a first multi-path in the set FFT window is contained in a first FFT window before the set FFT window, and when a second signal component constituting the target symbol together with a second inter-carrier interference signal component of a second multi-path in the set FFT window is contained in a second FFT window after the set FFT window, the channel simulator is configured to generate a first replica constituted of the first signal component and a second replica constituted of a second signal component; and
    the adder is configured to add the first replica and the second replica to the received OFDM signal.

6. The OFDM receiver according to claim 3, further comprising:
    an FFT window setter configured to set the FFT window used for the FFT processing, so as to cause the signal component constituting the target symbol and the one or more inter-carrier interference signal components in the set FFT window to be contained in one of a first FFT window before the set FFT window and a second FFT window after the set FFT window.

7. The OFDM receiver according to claim 1, wherein a guard interval length added to a training symbol is longer than that added to a data symbol.

8. The OFDM receiver according to claim 1, wherein a guard interval length added to a training symbol is decided based on a maximum number of compensation points.

9. The OFDM receiver according to claim 1, further comprising a MIMO equalizer.

* * * * *